US011055069B2

(12) United States Patent
Aoki et al.

(10) Patent No.: US 11,055,069 B2
(45) Date of Patent: Jul. 6, 2021

(54) TREE STRUCTURE DATA EDITING DEVICE, TREE STRUCTURE DATA EDITING METHOD, AND PROGRAM

(71) Applicant: Rakuten, Inc., Tokyo (JP)

(72) Inventors: Ryosuke Aoki, Tokyo (JP); Asami Ando, Tokyo (JP); Hidetomo Suzuki, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 520 days.

(21) Appl. No.: 15/749,119

(22) PCT Filed: Jul. 31, 2015

(86) PCT No.: PCT/JP2015/071883
§ 371 (c)(1),
(2) Date: Jan. 31, 2018

(87) PCT Pub. No.: WO2017/022041
PCT Pub. Date: Feb. 9, 2017

(65) Prior Publication Data
US 2018/0225268 A1    Aug. 9, 2018

(51) Int. Cl.
*G06F 8/33* (2018.01)
*G06F 16/31* (2019.01)
(Continued)

(52) U.S. Cl.
CPC .............. *G06F 8/33* (2013.01); *G06F 9/44* (2013.01); *G06F 16/322* (2019.01); *G06F 40/14* (2020.01); *G06F 40/154* (2020.01); *G06F 40/166* (2020.01)

(58) Field of Classification Search
CPC .. G06F 3/04842; G06F 21/6218; G06F 40/14; G06F 3/0481; G06F 16/23;
(Continued)

(56) References Cited

U.S. PATENT DOCUMENTS 5,493,678 A      2/1996  Arcuri et al.
6,714,201 B1 *   3/2004  Grinstein ................ G06T 13/20
                                                              345/474
(Continued)

FOREIGN PATENT DOCUMENTS

JP    S60-100226 A    6/1985
JP    H01-243113 A    9/1989
(Continued)

OTHER PUBLICATIONS

The Office Action dated Jan. 31, 2017, for corresponding JP application No. 2016-570367 and Partial Translation of the OA.
(Continued)

*Primary Examiner* — Angelica Ruiz
(74) *Attorney, Agent, or Firm* — HEA Law PLLC

(57) ABSTRACT

To reduce a burden on a user in editing tree structure data with a text editor. When a selection range is designated on an edit screen, a node selection unit of a tree structure data editing device selects one or more node IDs in the tree structure data, based on the position of the selection range. When a paste target for the selection range is designated on the edit screen, a connection target determination unit determines a connection target node ID in the tree structure data, based on the position of the paste target. A tree structure data editing unit edits the tree structure data such that the node or nodes identified by the one or more node IDs is/are connected to the node identified by the connection target node ID. A conversion unit convers the tree structure data edited by the tree structure data editing unit into text data. A display control unit updates the edit screen displayed, based on the text data converted by the conversion unit.

6 Claims, 21 Drawing Sheets

(51) Int. Cl.
*G06F 9/44* (2018.01)
*G06F 40/14* (2020.01)
*G06F 40/154* (2020.01)
*G06F 40/166* (2020.01)

(58) Field of Classification Search
CPC .. G06F 16/2455; G06F 16/282; G06F 16/958; G06F 40/106; G06F 40/186; G06F 8/34; G06F 3/04817; G06F 3/0486
See application file for complete search history.

(56) References Cited

U.S. PATENT DOCUMENTS

| | | | |
|---|---|---|---|
| 2001/0010518 A1 | 8/2001 | Saitou | |
| 2004/0225964 A1* | 11/2004 | Simonyi | G06F 8/71 715/256 |
| 2005/0182773 A1* | 8/2005 | Feinsmith | G06Q 10/10 |
| 2007/0094609 A1* | 4/2007 | Gilboa | G06F 8/34 715/762 |
| 2011/0271179 A1* | 11/2011 | Jasko | G06F 16/34 715/256 |
| 2014/0164352 A1* | 6/2014 | Denninghoff | H03H 9/25 707/711 |
| 2015/0125064 A1* | 5/2015 | Chen | G06K 9/6282 382/149 |
| 2015/0339307 A1* | 11/2015 | Hultgren | G06F 16/156 707/724 |
| 2015/0363525 A1* | 12/2015 | Bertilsson | G06F 8/00 703/2 |
| 2017/0046133 A1 | 2/2017 | Hoshikawa et al. | |

FOREIGN PATENT DOCUMENTS

| | | | |
|---|---|---|---|
| JP | H02-121030 A | | 5/1990 |
| JP | 06110886 A | * | 4/1994 |
| JP | 2001-291112 A | | 10/2001 |
| JP | 5666758 B1 | | 2/2015 |

OTHER PUBLICATIONS http://www.gnu.org/software/emacs/manual/html_node/emacs/Rectangles.html Rectangles.
Edited by Ken'ichi Harada, "Dai Ill Bu Zushiki Muki Programming-yoEditor: 4. YAC II Editor", Kozo Editor, 1st edition, Kyoritsu Shuppan, Co.,Ltd., Apr. 1, 1987 (Apr. 1, 1987), pp. 135 to 146, ISBN4-320-023110-0 Concise Explanation of relevance: English translation of the International Search Report for PCT/JP2015/071883.2. Partial Translation of the Office Action dated Jan. 31, 2017, for corresponding JP application No. 2016-570367.
Takashi Nakajima, "Development of tree structured chart tool", Dai 36Kai (Showa 63 Nen Zenki) Zenkoku Taikai Koen Ronbunshu ( II ),Information Processing Society of Japan, Mar. 16, 1988 (Mar. 16, 1988),pp. 901 to 902 (3L-5) Concise Explanation of relevance: English translation of the International Search Report for PCT/JP2015/071883.2. Partial Translation of the Office Action dated Jan. 31, 2017, for corresponding JP application No. 2016-570367.
English translation of the International Search Report for PCT/JP2015/071883.

\* cited by examiner

FIG.3

```
FILE  EDIT  CONVERT  SEARCH  TOOL  SET  WINDOW  HELP
```

T1 — @yes =|
T2 — <main>
T3 — if(param('abcdefg_design')=='slide') — renderDefault()  — T31
T4 — if(param('abcdefg_size')=='600x200') — if(param('abcdefg_size')=='468x160') — if(param('abcdefg_size')=='160x600') — renderDefault() — T30
T5 — random(50) — mpara('ab','notpcd')    random(50) — mpara('ab','notpcd')    random(50) — mpara('ab','notpcd')
                     renderMW() ~ T10        T12 renderMW() ~ T19        T21 renderMW() ~ T29
                              T9                   T18                         T28, T20
T6 — param('abcdefg.imageSize','135x135')   T13 param('abcdefg.imageSize','120x120')   T22 param('abcdefg.imageSize','120x120')
T7 — param('abcdefg.slideCell','4x1')       T14 param('abcdefg.slideCell','3x1')       T23 param('abcdefg.slideCell','1x4')
T8 — param('abcdefg.txtDisplay','off')      T15 param('abcdefg.txtDisplay','off')      T24 param('abcdefg.pattern','VID')
      mpara('ab','pcd')                     T16 mpara('ab','pcd')                      T25 param('abcdefg.txtDisplay','off')
      renderMW()                            T17 renderMW()                             T26 mpara('ab','pcd')
                                                                                        T27 renderMW()
```

| NODE ID | PARENT NODE ID | CHILD NODE ID | NODE |
|---|---|---|---|
| 1 | – | 2,31 | if(param('abcdefg_design'),'==','slide') |
| 2 | 1 | 3,11 | if(param('abcdefg_size'),'==','600x200') |
| 3 | 2 | 4,9 | random(50) |
| 4 | 3 | 5 | param('abcdefg_imageSize', '135x135') |
| 5 | 4 | 6 | param('abcdefg_slideCell', '4x1') |
| 6 | 5 | 7 | param('abcdefg_txtDisplay', 'off') |
| 7 | 6 | 8 | mpara('ab', 'pcd') |
| 8 | 7 | – | renderMW() |
| 9 | 3 | 10 | mpara('ab', 'notpcd') |
| 10 | 9 | – | renderMW() |
| 11 | 2 | 12,20 | if(param('abcdefg_size'),'==','468x160') |
| 12 | 11 | 13,18 | random(50) |
| 13 | 12 | 14 | param('abcdefg_imageSize', '120x120') |
| 14 | 13 | 15 | param('abcdefg_slideCell', '3x1') |
| 15 | 14 | 16 | param('abcdefg_txtDisplay', 'off') |
| 16 | 15 | 17 | mpara('ab', 'pcd') |
| 17 | 16 | – | renderMW() |
| 18 | 12 | 19 | mpara('ab', 'notpcd') |
| 19 | 18 | – | renderMW() |
| 20 | 11 | 21,30 | if(param('abcdefg_size'),'==','160x600') |
| 21 | 20 | 22,28 | random(50) |
| 22 | 21 | 23 | param('abcdefg_imageSize', '120x120') |
| 23 | 22 | 24 | param('abcdefg_slideCell', '1x4') |
| 24 | 23 | 25 | param('abcdefg_pattern','V1D') |
| 25 | 24 | 26 | param('abcdefg_txtDisplay', 'off') |
| 26 | 25 | 27 | mpara('ab', 'pcd') |
| 27 | 26 | – | renderMW() |
| 28 | 21 | 29 | mpara('ab', 'notpcd') |
| 29 | 28 | – | renderMW() |
| 30 | 20 | – | renderDefault() |
| 31 | 1 | – | renderDefault() |

FIG.6

| NODE ID | POSITION |
|---|---|
| 1 | POSITION INFORMATION 1 |
| 2 | POSITION INFORMATION 2 |
| 3 | POSITION INFORMATION 3 |
| 4 | POSITION INFORMATION 4 |
| 5 | POSITION INFORMATION 5 |
| 6 | POSITION INFORMATION 6 |
| 7 | POSITION INFORMATION 7 |
| 8 | POSITION INFORMATION 8 |
| 9 | POSITION INFORMATION 9 |
| 10 | POSITION INFORMATION 10 |
| 11 | POSITION INFORMATION 11 |
| 12 | POSITION INFORMATION 12 |
| 13 | POSITION INFORMATION 13 |
| 14 | POSITION INFORMATION 14 |
| 15 | POSITION INFORMATION 15 |
| 16 | POSITION INFORMATION 16 |
| 17 | POSITION INFORMATION 17 |
| 18 | POSITION INFORMATION 18 |
| 19 | POSITION INFORMATION 19 |
| 20 | POSITION INFORMATION 20 |
| 21 | POSITION INFORMATION 21 |
| 22 | POSITION INFORMATION 22 |
| 23 | POSITION INFORMATION 23 |
| 24 | POSITION INFORMATION 24 |
| 25 | POSITION INFORMATION 25 |
| 26 | POSITION INFORMATION 26 |
| 27 | POSITION INFORMATION 27 |
| 28 | POSITION INFORMATION 28 |
| 29 | POSITION INFORMATION 29 |
| 30 | POSITION INFORMATION 30 |
| 31 | POSITION INFORMATION 31 |

FIG.10

| NODE ID | PARENT NODE ID | CHILD NODE ID | NODE |
|---|---|---|---|
| 1 | – | 2,41 | if(param('abcdefg_design'),'==','slide') |
| 2 | 1 | 3,11 | if(param('abcdefg_size'),'==','600x200') |
| 3 | 2 | 4,9 | random(50) |
| 4 | 3 | 5 | param('abcdefg_imageSize', '135x135') |
| 5 | 4 | 6 | param('abcdefg_slideCell', '4x1') |
| 6 | 5 | 7 | param('abcdefg_txtDisplay', 'off') |
| 7 | 6 | 8 | mpara('ab', 'pcd') |
| 8 | 7 | – | renderMW() |
| 9 | 3 | 10 | mpara('ab', 'notpcd') |
| 10 | 9 | – | renderMW() |
| 11 | 2 | 21,30 | if(param('abcdefg_size'),'==','160x600') |
| 12 | 11 | 11,19 | random(50) |
| 13 | 12 | 14 | param('abcdefg_imageSize', '120x120') |
| 14 | 13 | 15 | param('abcdefg_slideCell', '1x4') |
| 15 | 14 | 16 | param('abcdefg_pattern','V1D') |
| 16 | 15 | 17 | param('abcdefg_txtDisplay', 'off') |
| 17 | 16 | 18 | mpara('ab', 'pcd') |
| 18 | 17 | – | renderMW() |
| 19 | 12 | 20 | mpara('ab', 'notpcd') |
| 20 | 19 | – | renderMW() |
| 21 | 11 | 22,30 | if(param('abcdefg_size'),'==','468x160') |
| 22 | 21 | 23,28 | random(50) |
| 23 | 22 | 24 | param('abcdefg_imageSize', '120x120') |
| 24 | 23 | 25 | param('abcdefg_slideCell', '3x1') |
| 25 | 24 | 26 | param('abcdefg_txtDisplay', 'off') |
| 26 | 25 | 27 | mpara('ab', 'pcd') |
| 27 | 26 | – | renderMW() |
| 28 | 22 | 29 | mpara('ab', 'notpcd') |
| 29 | 28 | – | renderMW() |
| 30 | 21 | 31,40 | if(param('abcdefg_size'),'==','160x600') |
| 31 | 30 | 32,38 | random(50) |
| 32 | 31 | 33 | param('abcdefg_imageSize', '120x120') |
| 33 | 32 | 34 | param('abcdefg_slideCell', '1x4') |
| 34 | 33 | 35 | param('abcdefg_pattern','V1D') |
| 35 | 34 | 36 | param('abcdefg_txtDisplay', 'off') |
| 36 | 35 | 37 | mpara('ab', 'pcd') |
| 37 | 36 | – | renderMW() |
| 38 | 31 | 39 | mpara('ab', 'notpcd') |
| 39 | 38 | – | renderMW() |
| 40 | 30 | – | renderDefault() |
| 41 | 1 | – | renderDefault() |

FIG.13

| NODE ID | POSITION |
|---|---|
| 1 | POSITION INFORMATION 1 |
| 2 | POSITION INFORMATION 2 |
| 3 | POSITION INFORMATION 3 |
| 4 | POSITION INFORMATION 4 |
| 5 | POSITION INFORMATION 5 |
| 6 | POSITION INFORMATION 6 |
| 7 | POSITION INFORMATION 7 |
| 8 | POSITION INFORMATION 8 |
| 9 | POSITION INFORMATION 9 |
| 10 | POSITION INFORMATION 10 |
| 11 | POSITION INFORMATION 11 |
| 12 | POSITION INFORMATION 12 |
| 13 | POSITION INFORMATION 13 |
| 14 | POSITION INFORMATION 14 |
| 15 | POSITION INFORMATION 15 |
| 16 | POSITION INFORMATION 16 |
| 17 | POSITION INFORMATION 17 |
| 18 | POSITION INFORMATION 18 |
| 19 | POSITION INFORMATION 19 |
| 20 | POSITION INFORMATION 20 |
| 21 | POSITION INFORMATION 21 |
| 22 | POSITION INFORMATION 22 |
| 23 | POSITION INFORMATION 23 |
| 24 | POSITION INFORMATION 24 |
| 25 | POSITION INFORMATION 25 |
| 26 | POSITION INFORMATION 26 |
| 27 | POSITION INFORMATION 27 |
| 28 | POSITION INFORMATION 28 |
| 29 | POSITION INFORMATION 29 |
| 30 | POSITION INFORMATION 30 |
| 31 | POSITION INFORMATION 31 |
| 32 | POSITION INFORMATION 32 |
| 33 | POSITION INFORMATION 33 |
| 34 | POSITION INFORMATION 34 |
| 35 | POSITION INFORMATION 35 |
| 36 | POSITION INFORMATION 36 |
| 37 | POSITION INFORMATION 37 |
| 38 | POSITION INFORMATION 38 |
| 39 | POSITION INFORMATION 39 |
| 40 | POSITION INFORMATION 40 |
| 41 | POSITION INFORMATION 41 |

| NODE ID | PARENT NODE ID | CHILD NODE ID | NODE |
|---|---|---|---|
| 1 | – | 2,31 | if(param('abcdefg_design'),'==','slide') |
| 2 | 1 | 3,11 | if(param('abcdefg_size'),'==','600x200') |
| 3 | 2 | 4,9 | random(50) |
| 4 | 3 | 5 | param('abcdefg_imageSize', '135x135') |
| 5 | 4 | 6 | param('abcdefg_slideCell', '4x1') |
| 6 | 5 | 7 | param('abcdefg_txtDisplay', 'off') |
| 7 | 6 | 8 | mpara('ab', 'pcd') |
| 8 | 7 | – | renderMW() |
| 9 | 3 | 10 | mpara('ab', 'notpcd') |
| 10 | 9 | – | renderMW() |
| 11 | 2 | 12,20 | if(param('abcdefg_size'),'==','468x160') |
| 12 | 11 | 13,18 | random(50) |
| 13 | 12 | 14,19 | random(50) |
| 14 | 13 | 15 | param('abcdefg_imageSize', '120x120') |
| 15 | 14 | 16 | param('abcdefg_slideCell', '3x1') |
| 16 | 15 | 17 | param('abcdefg_txtDisplay', 'off') |
| 17 | 16 | 18 | mpara('ab', 'pcd') |
| 18 | 17 | – | renderMW() |
| 19 | 13 | 20 | mpara('ab', 'notpcd') |
| 20 | 19 | – | renderMW() |
| 21 | 12 | 22 | mpara('ab', 'notpcd') |
| 22 | 21 | – | renderMW() |
| 23 | 11 | 24 | if(param('abcdefg_size'),'==','160x600') |
| 24 | 23 | 25 | param('abcdefg_imageSize', '120x120') |
| 25 | 24 | 26 | param('abcdefg_slideCell', '1x4') |
| 26 | 25 | 27 | param('abcdefg_pattern','V1D') |
| 27 | 26 | 28 | param('abcdefg_txtDisplay', 'off') |
| 28 | 27 | 29 | mpara('ab', 'pcd') |
| 29 | 28 | – | renderMW() |
| 30 | 23 | – | renderDefault() |
| 31 | 1 | – | renderDefault() |

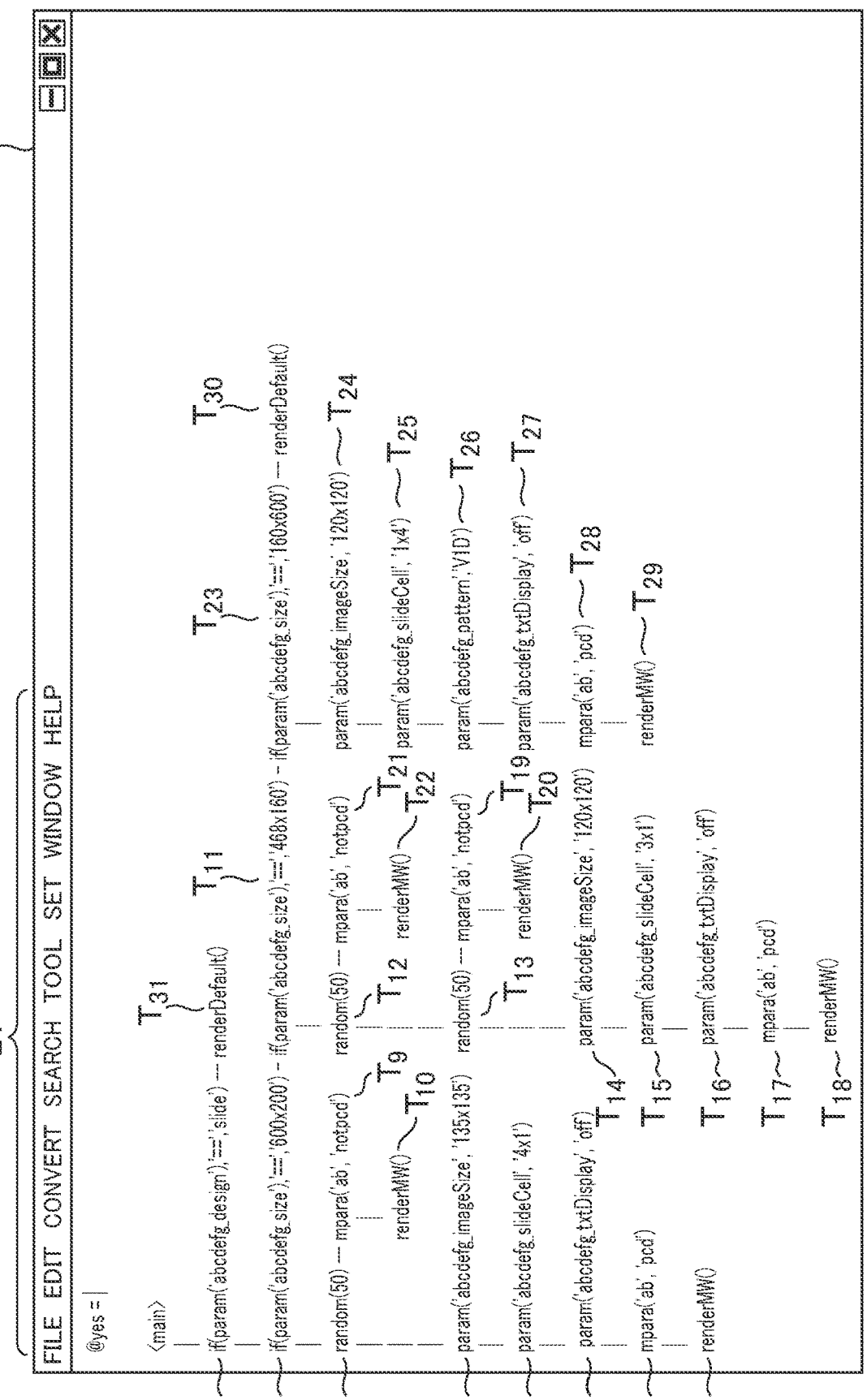

TREE STRUCTURE DATA EDITING DEVICE, TREE STRUCTURE DATA EDITING METHOD, AND PROGRAM

CROSS REFERENCE TO RELATED APPLICATIONS

This application is a National Stage of International Application No. PCT/JP2015/071883 filed on Jul. 31, 2015. The contents of the above document is incorporated herein by reference in its entirety.

TECHNICAL FIELD

The present invention relates to a tree structure data editing device, a method for editing tree structure data, and a program.

BACKGROUND ART

There has been long known a technique for allowing a user to select any range in text data shown on an edit screen. For example, Patent Literature 1 describes a command for making a rectangular selection with a text editor.

CITATION LIST

Non-Patent Literature

Non-Patent Literature 1: http://www.gnu.org/software/ema cs/manual/html_node/emacs/Rectangles.html

SUMMARY OF INVENTION

Technical Problem

A text editor such as is described above can be used, for example, for coding tree structure data in a programming language. In this case, a user inputs a text indicating a node or a branch with a text editor to thereby input a code for tree structure data. In order to repetitively use a subtree for similar content, a user may copy and paste a code corresponding to the subtree, rather than directly inputting the subtree again with a keyboard, which is burdensome.

Copying and pasting a code corresponding to a subtree selected through rectangular selection by the technique disclosed in Patent Literature 1, however, enables only simple insertion of a text on a text editor. This may possibly result in the pasted subtree not suitably connected where the subtree is pasted or other codes misaligned so that the tree structure described in text is broken because of the paste. In this case, a user is required to adjust the position of the text indicating a node or a branch so as to retain a desired tree structure, which is burdensome.

The present invention has been conceived in view of the above, and the object of the present invention is to reduce a burden on a user in editing tree structure data, using a text editor.

Solution to Problem

In order to achieve the above described object, according to the present invention, there is provided a tree structure data editing device including a conversion unit for mutually converting tree structure data and text data corresponding to the tree structure data; a display control unit for displaying an edit screen for the text data on a display unit; a node selection unit for selecting, when a selection range is designated on the edit screen, one or more node IDs in the tree structure data, based on the position of the selection range; a connection target determination unit for determining, when a paste target for the selection range is designated on the edit screen, a connection target node ID in the tree structure data, based on the position of the paste target; and a tree structure data editing unit for editing the tree structure data such that the node or nodes identified by the one or more node IDs is/are connected to the node identified by the connection target node ID, wherein the conversion unit converts the tree structure data edited by the tree structure data editing unit into the text data, and the display control unit updates the edit screen displayed, based on the text data converted by the conversion unit.

According to the present invention, there is provided a method for editing tree structure data, the method including a conversion step of mutually converting tree structure data and text data corresponding to the tree structure data; a display control step of displaying an edit screen for the text data on a display unit; anode selection step of selecting, when a selection range is designated on the edit screen, one or more node IDs in the tree structure data, based on the position of the selection range; a connection target determination step of determining, when a paste target for the selection range is designated on the edit screen, a connection target node ID in the tree structure data, based on the position of the paste target; and a tree structure data editing step of editing the tree structure data such that the node or nodes identified by the one or more node IDs is/are connected to the node identified by the connection target node ID, wherein at the conversion step, the tree structure data edited at the tree structure data editing step is converted into the text data, and at the display control step, the edit screen displayed is updated based on the text data converted at the conversion step.

According to the present invention, there is provided a program for causing a computer to function as a conversion unit for mutually converting tree structure data and text data corresponding to the tree structure data; a display control unit for displaying an edit screen for the text data on a display unit; a node selection unit for selecting, when a selection range is designated on the edit screen, one or more node IDs in the tree structure data, based on the position of the selection range; a connection target determination unit for determining, when a paste target for the selection range is designated on the edit screen, a connection target node ID in the tree structure data, based on the position of the paste target; and a tree structure data editing unit for editing the tree structure data such that the node or nodes identified by the one or more node IDs is/are connected to the node identified by the connection target node ID, wherein the conversion unit converts the tree structure data edited by the tree structure data editing unit into the text data, and the display control unit updates the edit screen displayed, based on the text data converted by the conversion unit.

According to the present invention, there is provided an information storage medium that is a computer readable information storage medium storing the above-described program.

In one embodiment of the present invention, the selection range may be a range for cutting out a text on the edit screen, the tree structure data editing device may further include a unit for specifying the parent node ID and a child node ID of the one or more node IDs, and the tree structure data editing unit may update the tree structure data such that the node or nodes identified by the one or more node IDs is/are connected to the node identified by the connection target node ID and the node identified by the child node ID is connected to the node identified by the parent node ID.

In one embodiment of the present invention, the connection target determination unit may determine the node ID of a node with text displayed at a position nearest to the position of the paste target as the connection target node ID.

In one embodiment of the present invention, the edit screen may be a screen of a text editor on which to input a code for a predetermined programming language, and the conversion unit may compile the text data to thereby convert into the tree structure data and decompile the tree structure data to thereby convert into the text data.

Advantageous Effects of Invention

The present invention can reduce a burden on a user in editing tree structure data with a text editor.

BRIEF DESCRIPTION OF DRAWINGS

FIG. 3 illustrates one example of text data.

FIG. 4 illustrates one example of tree structure data.

FIG. 6 illustrates one example of position data.

FIG. 10 illustrates tree structure data edited by a tree structure data editing unit.

FIG. 13 illustrates position data generated based on tree structure data edited.

FIG. 18 illustrates a paste target designated in a modified example.

FIG. 19 illustrates tree structure data updated in a modified example.

FIG. 21 illustrates an edit screen after update of tree structure data.

DESCRIPTION OF EMBODIMENTS

[1. Hardware Configuration of Tree Structure Data Editing Device]

Figure 1:
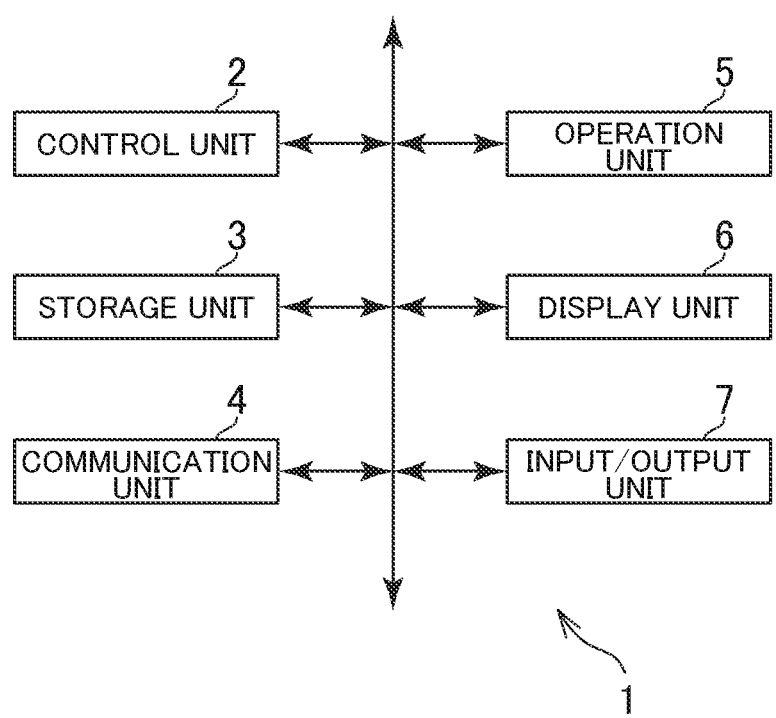
FIG. 1 illustrates a hardware configuration of a tree structure data editing device.

The following describes an example of an embodiment of a tree structure data editing device according to the present invention. FIG. 1 illustrates a hardware configuration of a tree structure data editing device. The tree structure data editing device 1 is a computer available for use by a user, and is, for example, a personal computer, a server computer, a personal digital assistant (including a tablet computer), or portable phone (including a smart phone). The tree structure data editing device 1 includes a control unit 2, a storage unit 3, a communication unit 4, an operation unit 5, a display unit 6, and an input/output unit 7.

The control unit 2 includes one or more microprocessors, for example. The control unit 2 executes processing according to a program and data stored in the storage unit 3. The storage unit 3 includes a main storage unit and an auxiliary storage unit. For example, the main storage unit is a RAM, while the auxiliary storage unit is a hard disk or a solid state drive. The communication unit 4 includes a network card. The communication unit 4 executes data communication via a network.

The operation unit 5 is an input device for use by a user to perform an operation, and is, for example, a mouse, a keyboard, or a touch panel. The operation unit 5 transmits the content of operation by a user to the control unit 2. The display unit 6 is, for example, a liquid crystal display unit or an organic EL display. The display unit 6 displays a screen image in response to an instruction from the control unit 2. The input/output unit 7 is an input/output interface for inputting or outputting data with respect to an external device. For example, the input/output unit 7 reads data or a program from a computer readable information storage medium (for example, an optical disk or a memory card).

A program and data described here as being stored in the storage unit 3 may be supplied to the storage unit 3 from another computer connected to a network via the communication unit 4 or from an information storage medium via the input/output unit 7. The hardware configuration of the tree structure data editing device 1 may not be limited to the above described example, and various pieces of computer hardware are applicable.

[2. Functions Implemented in Tree Structure Data Editing Device]

Figure 2:
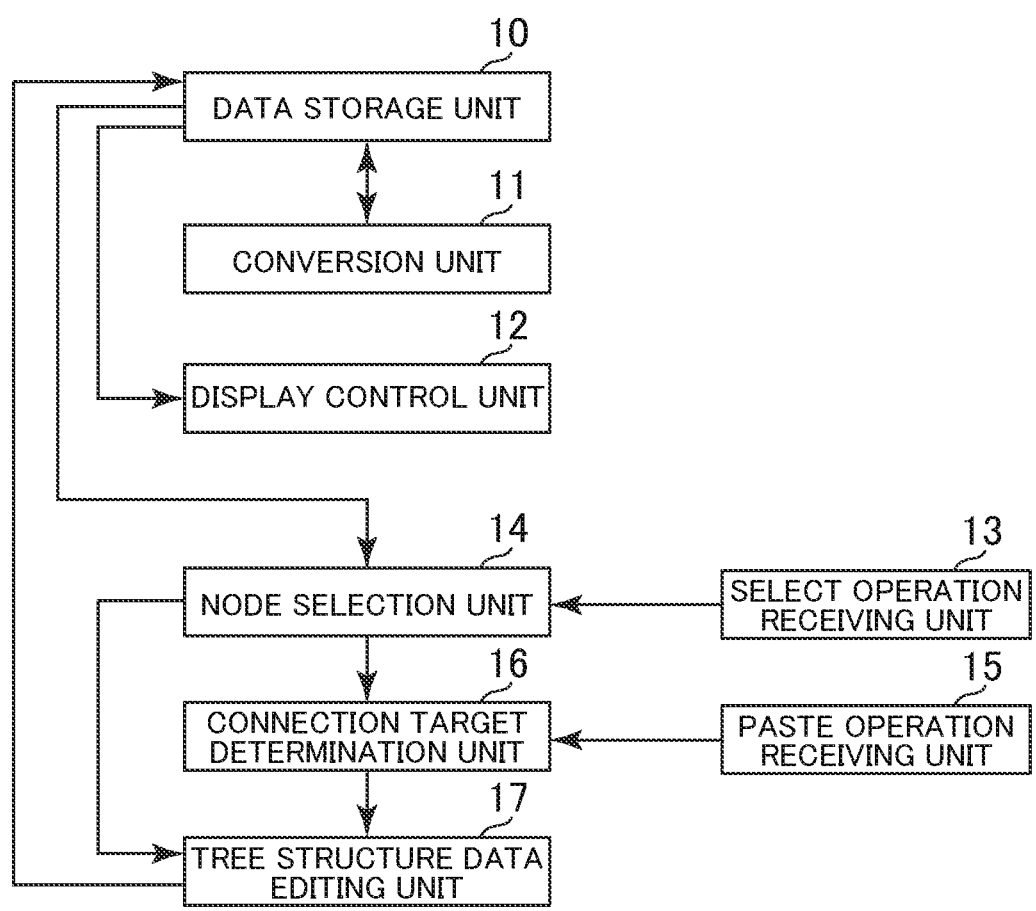
FIG. 2 is a functional block diagram of one example of functions implemented in a tree structure data editing device.

FIG. 2 is a functional block diagram of one example of functions implemented in the tree structure data editing device 1. As illustrated in FIG. 2, implemented in the tree structure data editing device 1 are a data storage unit 10, a conversion unit 11, a display control unit 12, a select operation receiving unit 13, a node selection unit 14, a paste operation receiving unit 15, a connection target determination unit 16, and a tree structure data editing unit 17.

In this embodiment, the functions of the tree structure data editing device 1 will be described while referring to an example in which a text selected by a user through rectangular selection is copied and pasted when editing the source code of tree structure data implemented in a predetermined programming language (hereinafter simply referred to as a code) with a text editor. A program for a text editor includes a compiler and a decompiler, as will be described later in detail. A binary tree is described as a tree structure in this embodiment.

[2-1. Data Storage Unit]

The data storage unit 10 is implemented mainly using the storage unit 3. The data storage unit 10 stores various data for editing tree structure data. As examples of data stored in the data storage unit 10, text data, tree structure data, and position data will be described.

[Text Data]

FIG. 3 illustrates one example of text data. In particular, FIG. 3 illustrates text data displayed on an edit screen 20 to be described later. As illustrated in FIG. 3, text data includes a text indicating a node and a text indicating a branch contained in tree structure data. The content of the text data is updated, based on an input signal from the operation unit 5, such as a keyboard, or by the conversion unit 11 to be described later.

Each character string $T_n$ (n being a natural number and corresponding to anode ID to be described later in this embodiment) indicates the content of a node. For example, each character string $T_n$ is a code for a predetermined programming language, and is, for example, a conditional expression or a function. In the example illustrated in FIG. 3, character strings $T_1$, $T_2$, $T_3$, $T_{11}$, $T_{12}$, $T_{20}$, $T_{21}$, each indicating a node for a branch, are conditional expressions. For example, when the condition expressed by each conditional expression is fulfilled, the program proceeds to the node indicated by a subsequent character string $T_n$ (the left node of a binary tree), while, when the condition is not fulfilled, the program proceeds to the node indicated by the right character string $T_n$ (the right node of the binary tree). For example, each of the character strings $T_1$, $T_2$, $T_{11}$, $T_{20}$ is an if-check for determining whether or not the parameter of an argument fulfills a predetermined condition, while each of the character strings $T_3$, $T_{12}$, $T_{21}$ is a condition that will be fulfilled with a 50% probability, based on a random number.

Each symbol indicates a branch that connects two nodes. Each symbol is placed between a character string $T_n$ indicating a node and another character string $T_n$ indicating another node. The symbol may be any symbol that allows visual recognition of connection between two character strings $T_n$. For example, a symbol representing a branch may be "-" (hyphen), "|" (vertical line), "+" (plus), or "–" (minus). Alternatively, the symbol may be, for example, "--", "|", "-|", "|-", "|--", or other types of lines. In this embodiment, "-" (hyphen) and "|" (vertical line) are used as symbols representing a branch. Each branch may be represented by one or more symbols.

A character string $T_n$ indicating each node has a symbol representing a branch and placed at at least one of the positions thereabove, therebelow, to the left thereof, and to the right thereof. The positional relationship between each character string $T_n$ and each symbol indicates a connection relationship between nodes in the tree structure data.

For example, in the case where one character string $T_n$ is connected to another character string $T_n$ via a symbol placed below the one character string $T_n$, the node indicated by the one character string $T_n$ is the parent node of the node indicated by the other character string $T_n$. In the example in FIG. 3, as the character string $T_1$ is connected to the character string $T_2$ via "|" positioned below the character string $T_1$, the node indicated by the character string $T_1$ is the parent node of the node indicated by the character string $T_2$.

In other words, in the case where one character string $T_n$ is connected to another character string $T_n$ via a symbol placed above the one character string $T_n$, the node indicated by the one character string $T_n$ is a child node of the node indicated by the other character string $T_n$. In the example illustrated in FIG. 3, as the character string $T_2$ is connected to the character string $T_1$ via "|" positioned above the character string $T_2$, the node indicated by the character string $T_2$ is a child node of the node indicated by the character string $T_1$.

For example, in the case where one character string $T_n$ is connected to another character string $T_n$ via a symbol placed to the right of the one character string $T_n$, the node indicated by the one character string $T_n$ is the parent node of the node indicated by the other character string $T_n$. In the example illustrated in FIG. 3, as the character string $T_1$ is connected to the character string $T_{31}$ via two "-", placed to the right of the character string $T_1$, the node indicated by the character string $T_1$ is the parent node of the node indicated by the character string $T_{31}$.

In other words, in the case where one character string $T_n$ is connected to another character string $T_n$ via a symbol placed to the left of the one character string $T_n$, the node indicated by the one character string $T_n$ is a child node of the node indicated by the other character string $T_n$. In the example illustrated in FIG. 3, as the character string $T_{31}$ is connected to the character string $T_1$ via two "-", placed to the left of the character string $T_{31}$, the node indicated by the character string $T_{31}$ is a child node of the node indicated by the character string $T_1$.

In this embodiment, it is possible to define a root node by a predetermined character string, that is, "<main>". In the code example in FIG. 3, the node indicated by the character string $T_1$ connected to "<main>" via "|" is a root node. That is, the character string of "<main>" is a code for defining a root node.

In the case where one character string $T_n$ does not have any symbol placed to the right thereof or therebelow or has a symbol that is placed to the right thereof or therebelow and has no other character string $T_n$ following the symbol, the node indicated by the one character string $T_n$ is a leaf node. In the code example in FIG. 3, the character strings $T_8$, $T_{10}$, $T_{17}$, $T_{19}$, $T_{27}$, $T_{29}$, $T_{30}$, $T_{31}$ are leaf nodes as having no symbol placed to the right thereof or therebelow.

The text data may contain a text other than a text for a node or a branch. For example, the text data may contain a character string representing a header or a comment.

[Tree Structure Data]

Figure 5:
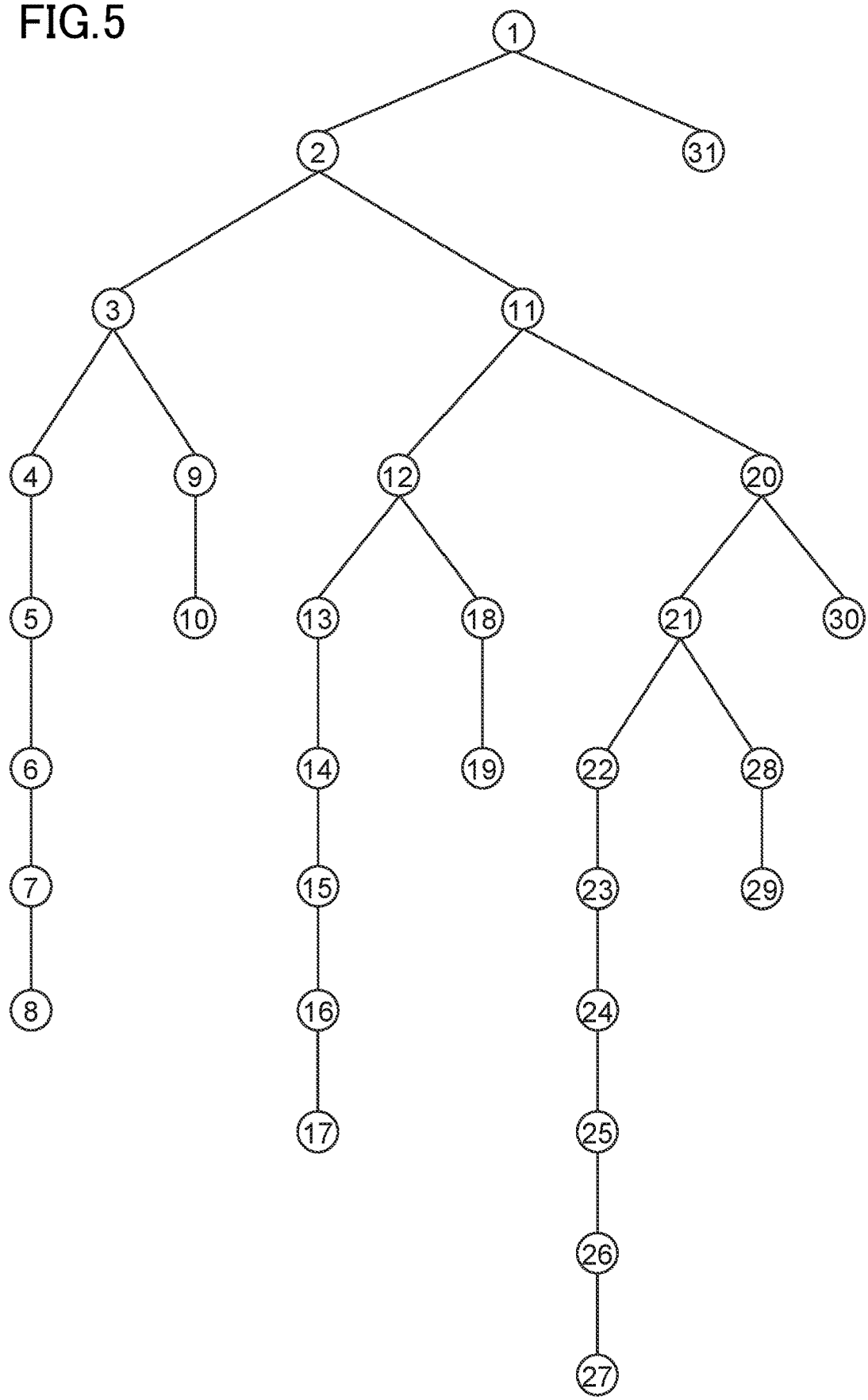
FIG. 5 illustrates connection relationship between respective nodes in the tree structure data illustrated in FIG. 4.

FIG. 4 illustrates one example of tree structure data. FIG. 5 illustrates connection relationship between respective nodes in the tree structure data illustrated in FIG. 4. As illustrated in FIG. 4, the tree structure data expresses the content (data portion) of each of the nodes in a tree structure and connection relationship between the nodes, in which, for example, a node ID, the node ID of the parent node, the node ID of a child node, and the content of a node are associated with one another. In FIG. 5, the number in a circle corresponds to the node ID in FIG. 4.

A node ID is information for uniquely identifying each node, and is, for example, a node number (a pointer) assigned to each node. In this embodiment, node IDs are sequentially assigned, beginning with one, to the respective nodes retrieved in a pre-order search, beginning with the root node. In the example illustrated in FIG. 4, the node IDs of both the parent node and a child node are stored so as to be associated with each node ID, though the node ID of only either one of the parent node and a child node may be stored.

In this embodiment, as text data contains a code for a programming language, the tree structure data illustrated in FIG. 4 is generated by compiling the text data illustrated in FIG. 3. In other words, decompiling the tree structure data illustrated in FIG. 4 generates the text data illustrated in FIG. 3. Although the content of a node is expressed by a character string in FIG. 4, the content of a node is actually expressed in a machine code.

In the code example illustrated in FIG. 3, the node indicated by the character string $T_1$ is a root node, and is assigned with the node ID "1", as illustrated in FIGS. 4 and 5. The node with the node ID "1" is a root node and has no parent node. As illustrated in FIG. 4, as the node with the node ID "1" has no parent node ID, for example, "NULL" is stored for the parent node ID thereof.

Child nodes of the root node are nodes indicated by the character strings $T_2$ and $T_{31}$, respectively, and assigned with node IDs "2" and "31", respectively. Accordingly, as illustrated in FIGS. 4 and 5, the child node IDs of the node with the node ID "1" are "2" and "31". Meanwhile, the parent node IDs of the respective nodes with the node IDs "2" and "31" are both "1". As described above, as the node indicated by the character string $T_{31}$ (the node with the node ID "31") is a leaf node, and has no child node ID, for example, "NULL" is stored for the chide node ID thereof, as illustrated in FIG. 4. Similarly, the parent-child relationships of the other nodes, as defined by the text data illustrated in FIG. 3, are as illustrated in FIGS. 4 and 5. That is, each of the character strings $T_2$, $T_3$, $T_{11}$, $T_{12}$, $T_{20}$, $T_{21}$ is a conditional expression, and each of the nodes indicated by these character strings, that is, nodes with the node IDs "2", "3", "11", "12", "20", and "21", respectively, has two child nodes. Meanwhile, each of the other nodes, which are not conditional expressions but are functions, is a node having one child node or is a leaf node.

[Position Data]

FIG. 6 illustrates one example of position data. As illustrated in FIG. 6, the position data includes the node ID of each node in the tree structure data and information on the position of the character string $T_n$ indicating the node in the text data, in which the node ID is associated with the position information. The position data may be generated by the conversion unit 11 to be described later when decompiling or compiling. The position information may indicate the position of the character string $T_n$ indicating a node in the text data, and indicates, for example, that the character string $T_n$ indicating that node is placed at the $n^{th}$ character in the text data. The position information may be any information that allows specification of a node in text data, and may indicate the display position of the character string $T_n$ on the edit screen 20. In this case, two-dimensional (2D) information, rather than one-dimensional information, is stored as the position information.

The data stored in the data storage unit 10 is not limited to text data or tree structure data. The data storage unit 10 may store any data necessary to edit tree structure data. For example, the data storage unit 10 may store a program for a text editor.

[2-2. Conversion Unit]

The conversion unit 11 is implemented mainly using the control unit 2. The conversion unit 11 mutually converts tree structure data and text data corresponding to the tree structure data. Assume that conversion data that defines these conversion rules may be stored in advance in the data storage unit 10. Conversion data includes a conversion algorithm for converting text data into tree structure data and a conversion algorithm for converting tree structure data into text data.

In this embodiment, the conversion data includes a compiler and a decompiler for use with a predetermined programming language, and is contained in a program for a text editor. A compiler is a program for generating an object code written in a machine code from a code written in a programming language, while a decompiler is a program for analyzing an object code written in a machine code to generate a code readily and visually understandable for a user. The conversion unit 11 compiles text data to thereby convert into tree structure data, and decompiles tree structure data to thereby convert into text data.

For example, the conversion unit 11 compiles text data in a manner to be described below. That is, the conversion unit 11 initially specifies a root node, based on a predetermined character string $T_n$ contained in text data. Specifically, in this embodiment, the conversion unit 11 specifies as a root node a code connected via "|" placed below a predetermined code, namely, "<main>". The conversion unit 11 then determines whether or not there is a specific symbol representing a branch, namely, "|" or "-", placed around (below or to the right of) the character string $T_n$ indicating the root node. Upon determination of the presence of such a specific symbol, the conversion unit 11 specifies a character string $T_n$ following the symbol as a child node of the root node. Thereafter, the conversion unit 11 similarly searches an area around each node to determine whether or not there is a symbol, namely, "|" or "-". Upon determination of the presence of such a symbol, the conversion unit 11 specifies a character string $T_n$ following the symbol as a child node of the node. Meanwhile, upon determination of the absence of such a symbol, namely, "|" or "-", around the node or the presence of such a symbol, namely, "|" or "-", around the node and the absence of a character string $T_n$ following the symbol, the conversion unit 11 specifies the node as a leaf node. The conversion unit 11 specifies a parent-child relationship of the respective nodes as described above, and assigns node IDs to the respective nodes sequentially in a predetermined order, whereby tree structure data is generated.

On the other hand, the conversion unit 11 decompiles tree structure data in a manner to be described below, for example. That is, the conversion unit 11 initially specifies a node having no parent node ID in the tree structure data (that is, a node with "NULL" stored therefor) as a root node. Thereafter, the conversion unit 11 places a predetermined code, namely, "<main>", in a predetermined position in the text data, then places a specific symbol representing a branch, namely, "|", below the predetermined code, then generates a character string $T_n$ indicating the root node, and places the character string $T_n$ generated so as to follow the symbol. Assume that a conversion table for nodes and character strings $T_n$ is stored in advance in the data storage unit 10. With reference to the child node ID of the root node in the tree structure data, the conversion unit 11 specifies a child node. In the case where one child node is specified, the conversion unit 11 places the symbol "|" below the character string $T_n$ indicating the root node, and then places a character string $T_n$ indicating the child node below the symbol. Meanwhile, in the case where two child nodes are specified, the conversion unit 11 places a symbol "|" below the character string $T_n$ indicating the root node, then places a character string $T_n$ indicating the child node with a smaller node ID below the symbol, further places a symbol "-" to the right of the character string $T_n$ indicating the root node, and then places a character string $T_n$ indicating the child node with a larger node ID so as to follow the symbol. Thereafter, the conversion unit 11 repeats specification of a child node, placement of a symbol representing a branch, and placement of a character string $T_n$ indicating the child node, whereby text data is generated from the tree structure data. The conversion unit 11 may adjust the number of symbols representing a branch such that the respective character strings $T_n$ are not connected to each other, depending on the number of characters included in the character string $T_n$ indicating a node, the position of the character string $T_n$ indicating another node around the node, and the number of characters included in the other node.

[2-3. Display Control Unit]

The display control unit 12 is implemented mainly using the control unit 2. The display control unit 12 displays the edit screen 20 for text data on the display unit 6. The edit screen 20 is a screen on which to edit text data, and is, for example, a screen of a text editor. In this embodiment, in which text data contains a code for a programming language, the edit screen 20 can be phrased as a screen of a text editor on which to input a code for a predetermined programming language. As illustrated in FIG. 3, the edit screen 20 has a menu bar 21 showing a menu for various available functions of the text editor.

[2-4. Select Operation Receiving Unit]

The select operation receiving unit 13 is implemented mainly using the control unit 2. The select operation receiving unit 13 receives a select operation for selecting a range on the edit screen 20, based on an input signal from the operation unit 5. A selection range is a range to copy a text on the edit screen 20. Although a rectangular selection is made on the edit screen 20 through a select operation in this embodiment, the selection range may not be necessarily rectangular. A user can make a rectangular selection by selecting an edit button on the menu bar 21 or inputting a predetermined command with the operation unit 5.

Figure 7:
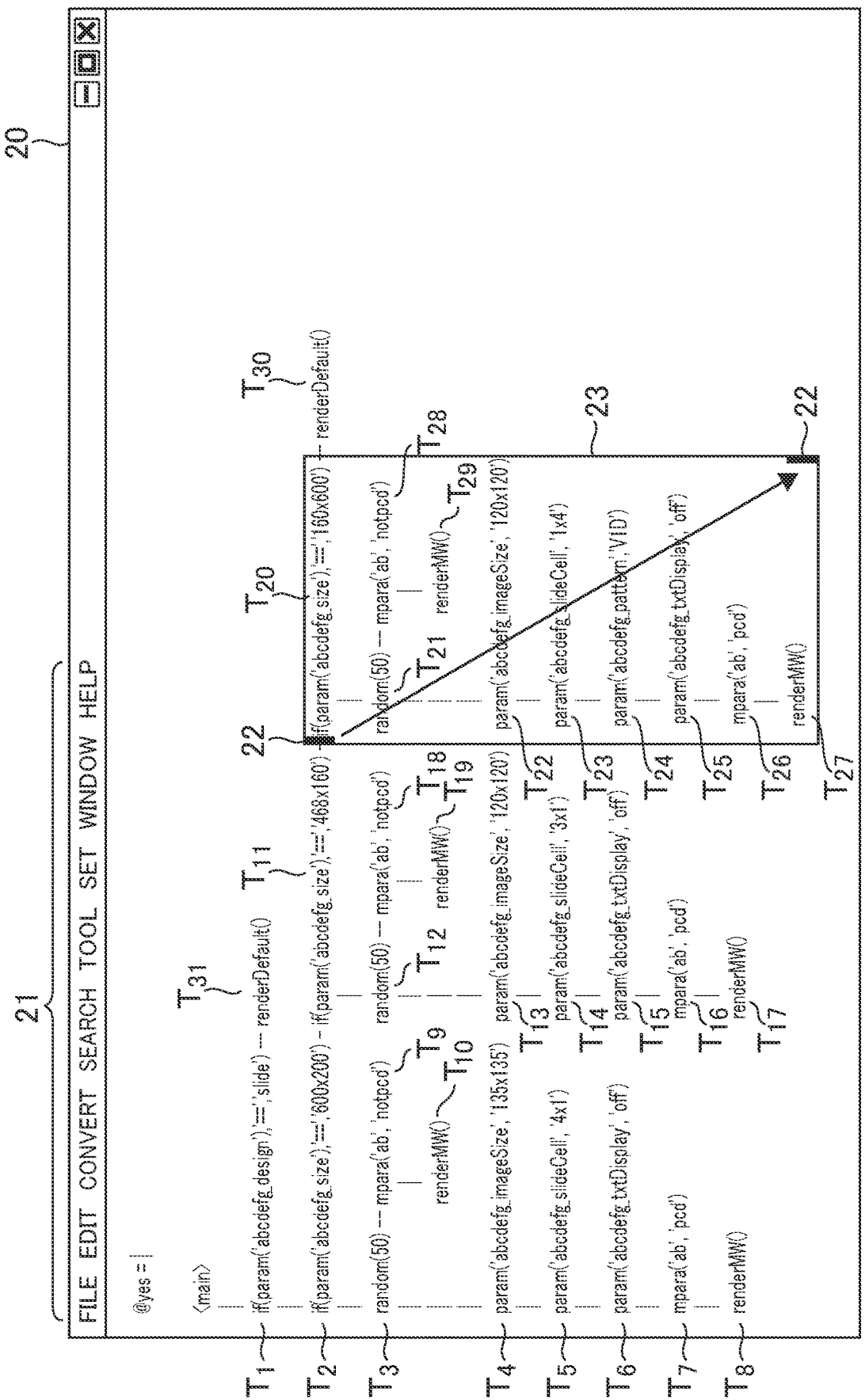
FIG. 7 illustrates rectangular selection being made with a text editor.

FIG. 7 illustrates a rectangular selection being made with a text editor. As illustrated in FIG. 7, a user designates a start position and an end position with a cursor 22 shown on the edit screen 20 to thereby select a rectangular selection range 23 having a diagonal line extending between the start position and the end position. The selection range 23 here contains character strings $T_{20}$ to $T_{29}$ and symbols representing branches connecting these character strings $T_{20}$ to $T_{29}$. A user may use a mouse pointer, for example, instead of the cursor 22, to make a rectangular selection.

[2-5. Node Selection Unit]

The node selection unit 14 is implemented mainly using the control unit 2. Upon designation of the selection range 23 on the edit screen 20, the node selection unit 14 selects one or more node IDs in the tree structure data, based on the position of the selection range 23. In this embodiment, the node selection unit 14 specifies the node ID selected, based on the position data. For example, the node selection unit 14 determines the position of the selection range 23 in the text data, and specifies a node ID positioned within the selection range 23.

Figure 8:
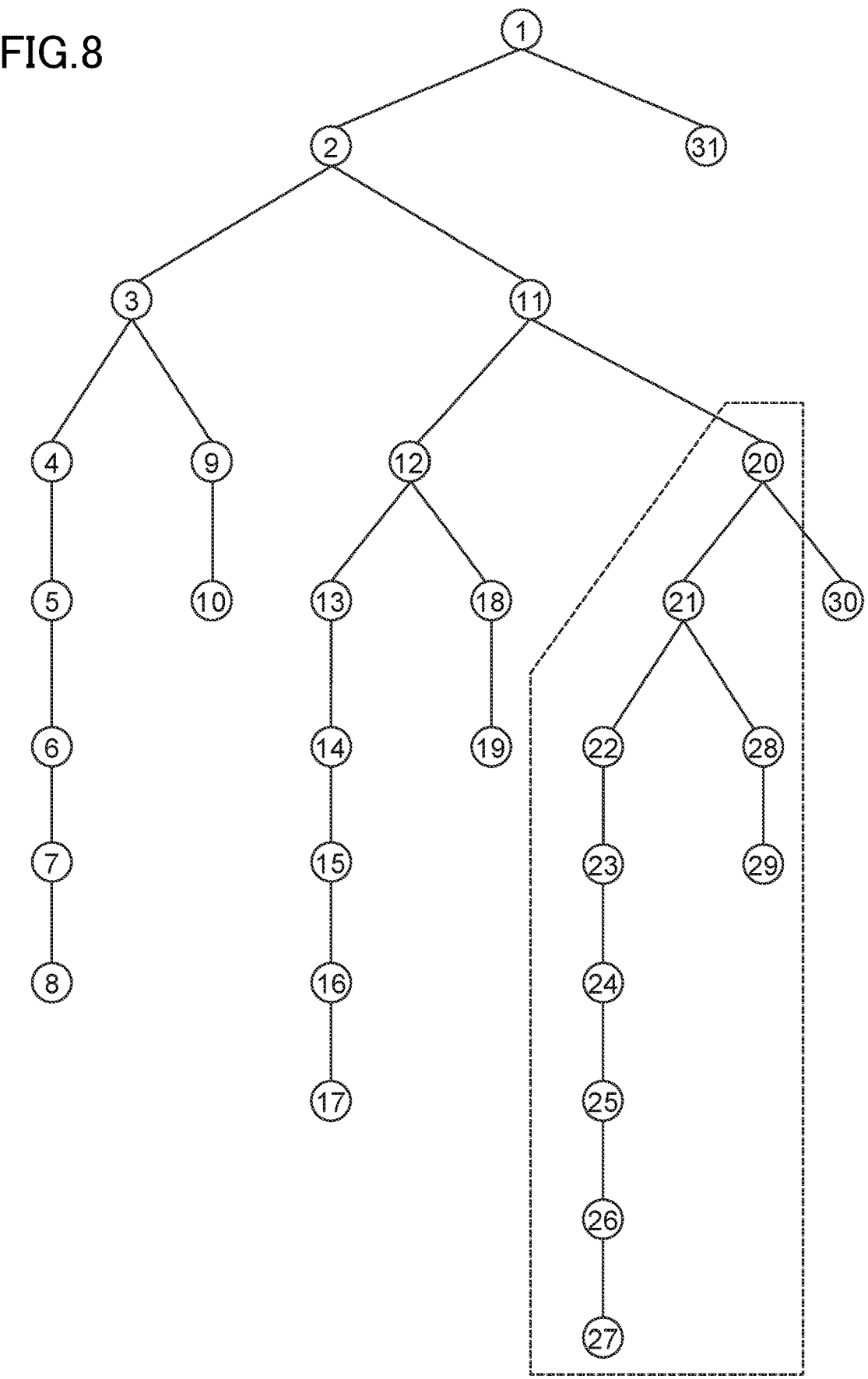
FIG. 8 illustrates node ID selected when a rectangular selection is made as illustrated in FIG. 7.

FIG. 8 illustrates node IDs selected through rectangular selection made as illustrated in FIG. 7. Specifically, with reference to the position data, the node selection unit 14 searches the selection range 23 selected through rectangular selection in FIG. 7 to resultantly obtain node IDs in a subtree (indicated by the broken line in FIG. 8), namely, node IDs "20" to "29". Accordingly, the node selection unit 14 specifies the ten node IDs, namely, node IDs "20" to "29", as the nodes selected through rectangular selection.

[2-6. Paste Operation Receiving Unit]

Figure 9:
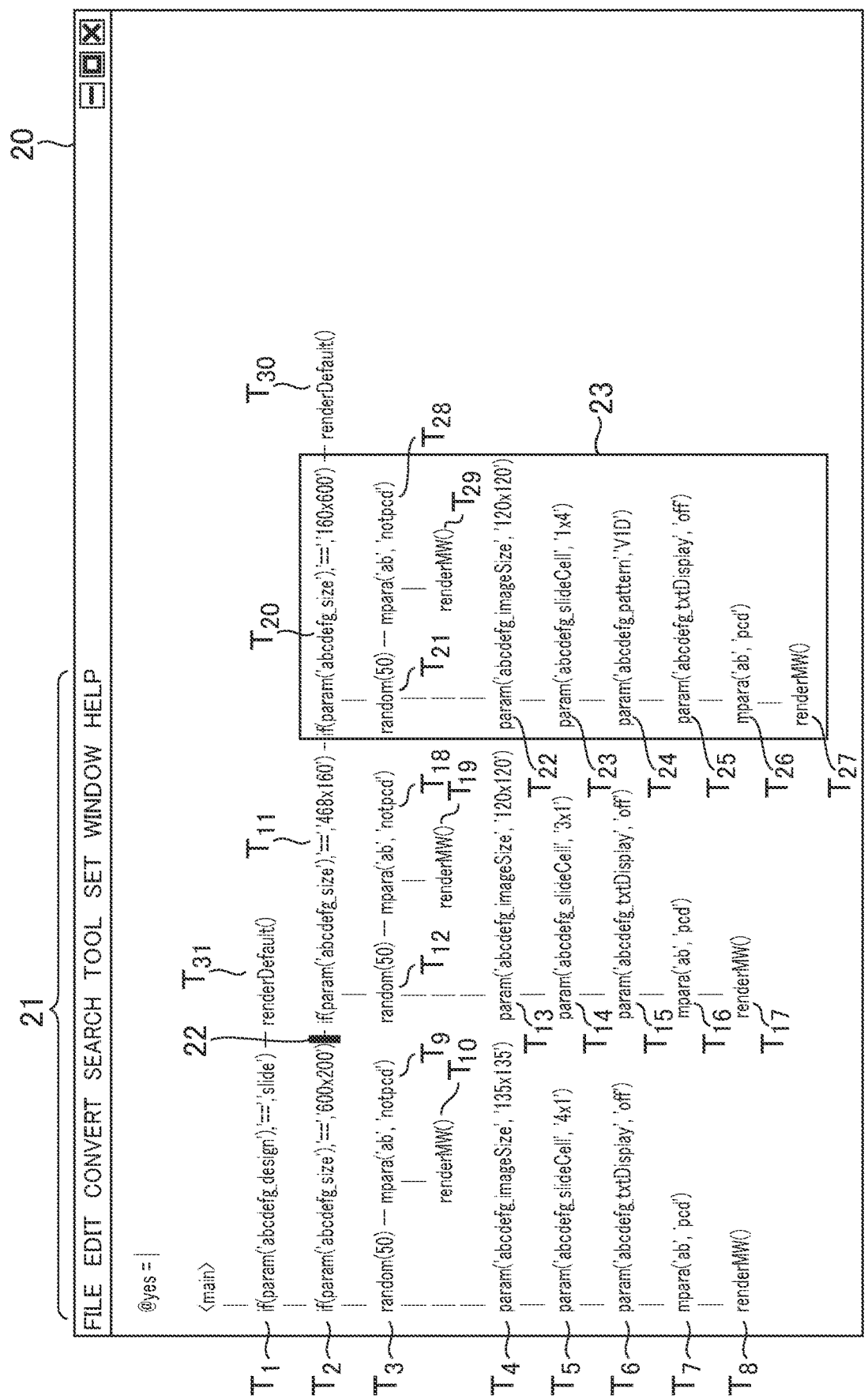
FIG. 9 illustrates a paste operation being performed.

The paste operation receiving unit 15 is implemented mainly using the control unit 2. The paste operation receiving unit 15 receives a paste operation for pasting the text in the selection range 23, based on an input signal from the operation unit 5. FIG. 9 illustrates a paste operation being performed. As illustrated in FIG. 9, a user designates any position on the edit screen 20 with the cursor 22 in a paste operation. A user may use a mouse pointer, for example, to make a rectangular selection.

[2-7. Connection Target Determination Unit]

The connection target determination unit 16 is implemented mainly using the control unit 2. Upon designation of a position at which to paste the selection range 23 on the edit screen 20, the connection target determination unit 16 determines the node ID of a connection target in the tree structure data, based on the position of the past target. In this embodiment, the connection target determination unit 16 determines the node ID of a node with a text shown at a position nearest to the position of the paste target as a connection target node ID.

For example, the connection target determination unit 16 determines a connection target node ID, based on the position data. Specifically, the connection target determination unit 16 specifies a position in the text data designated in a paste operation, and searches for a node ID at a position nearest to the position specified to determine the node ID as a connection target. For example, as illustrated in FIG. 9, in the case where the position designated in a paste operation is near the position of the character string $T_2$, the connection target determination unit 16 determines the node with the node ID "2" as a connection target.

[2-8. Tree Structure Data Editing Unit]

The tree structure data editing unit 17 is implemented mainly using the control unit 2. The tree structure data editing unit 17 edits the tree structure data such that the node or nodes identified by the one or more node IDs specified by the node selection unit 14 is/are connected to the node identified the connection target node ID. That is, the tree structure data editing unit 17 compiles such that the subtree including the one or more node IDs specified by the node selection unit 14 is inserted so as to have the connection target node ID as the parent node, to thereby update the tree structure data.

Figure 11:
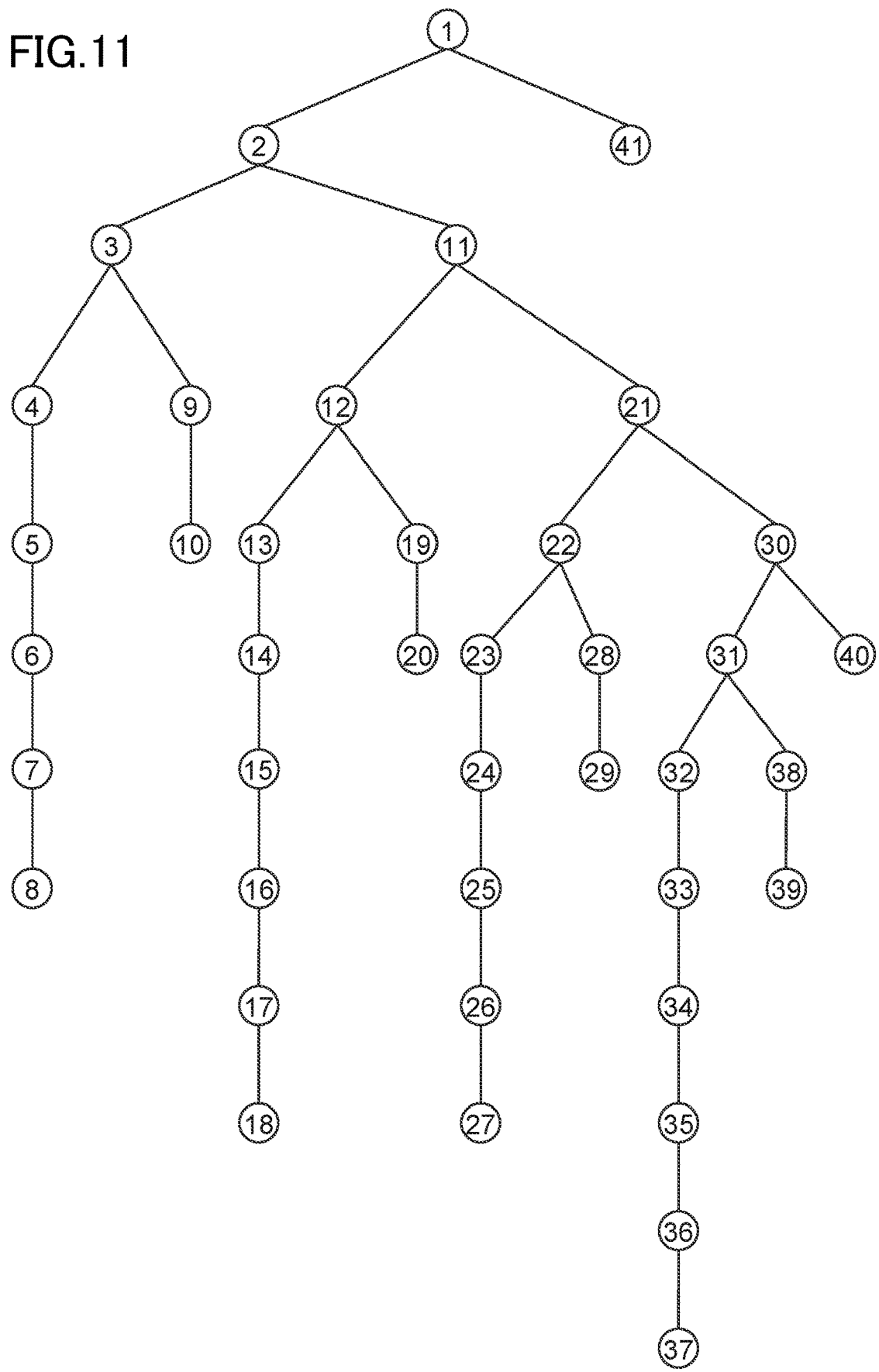
FIG. 11 illustrates tree structure data edited by a tree structure data editing unit.

FIGS. 10 and 11 illustrate tree structure data having been edited by the tree structure data editing unit 17. In this embodiment, the node IDs are reassigned after the tree structure data editing unit 17 edits the tree structure data. As illustrated in FIGS. 10 and 11, the nodes with the node IDs "1" to "10" are the same as those before being edited, and the nodes with the node IDs "11" to "20" have the content same as that of the nodes with the node IDs "20" to "29" selected in FIG. 8. That is, the subtree in the selection range 23 is inserted as a child node of the node ID "2", or the connection target node ID. The nodes with the node IDs "21" to "40" illustrated in FIG. 11 have the content same as that of the nodes with the node IDs "11" to "30" illustrated in FIG. 8. That is, while the node with the node ID "11" illustrated in FIG. 8 has the node with the node ID "2" as the parent node, insertion of the subtree in the selection range 23 makes the node with the node ID "11" be a child node of the node ID "20" ("12" in FIG. 11), or the root node of the subtree.

After the processing by the tree structure data editing unit 17, the conversion unit 11 converts the tree structure data edited by the tree structure data editing unit 17 into text data. For example, the conversion unit 11 decompiles the tree structure data edited to thereby convert into text data. A decompiling method is the same as described above. In addition, the tree structure data editing unit 17 updates the position data, based on the tree structure data edited. Specifically, in generation of a character string $T_n$ indicating a node with each node ID, the tree structure data editing unit 17 may calculate the position of the character string $T_n$ in the text data to update the position data. After the processing by the tree structure data editing unit 17, the display control unit 12 updates the edit screen 20 displayed, based on the text data converted by the conversion unit 11.

Figure 12:
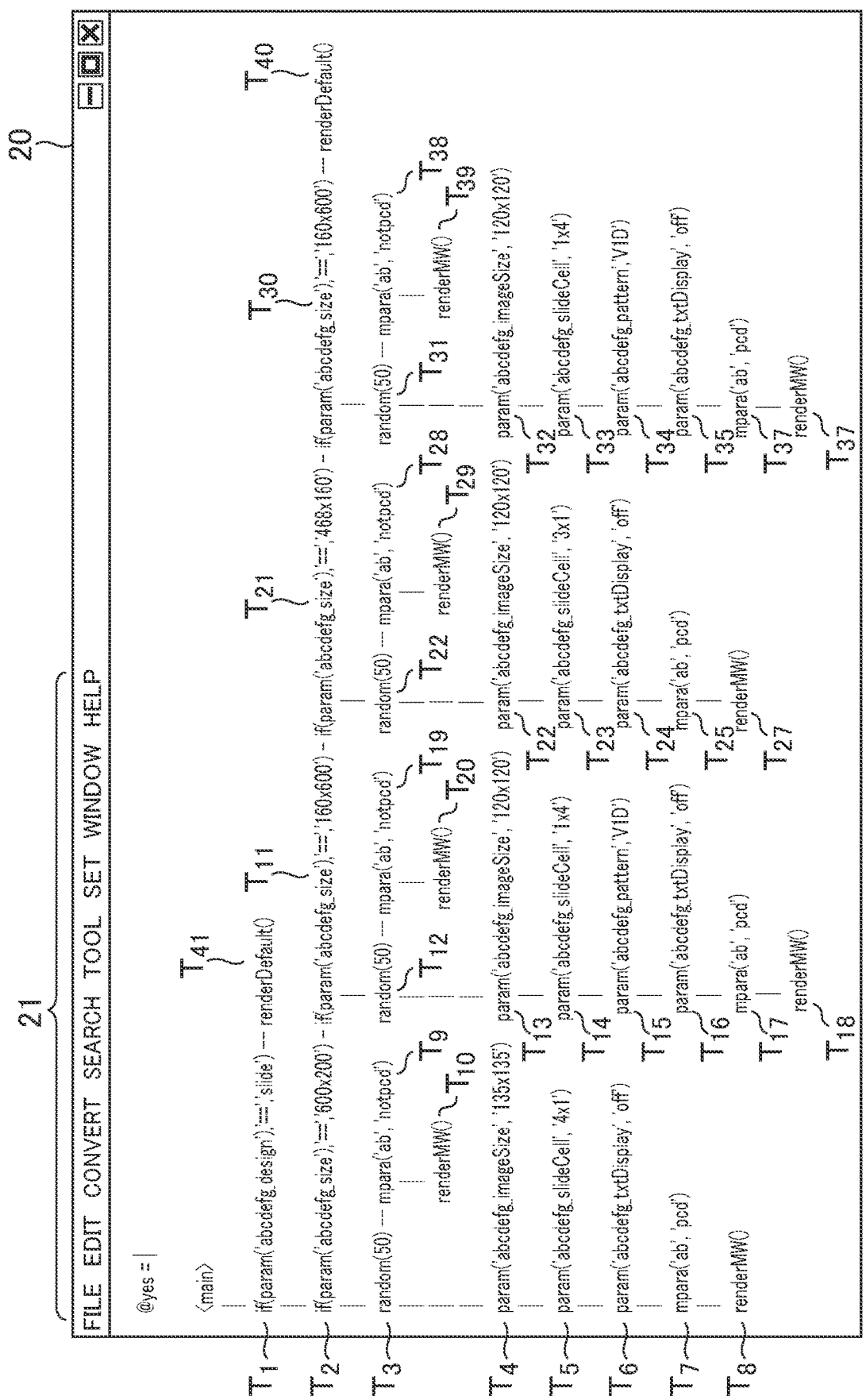
FIG. 12 illustrates text data after being edited.

FIG. 12 illustrates the text data edited. FIG. 13 illustrates the position data generated based on the tree structure data edited. Specifically, text data indicating the tree structure data edited is generated as illustrated in FIG. 12, and the position data is updated so as to indicate the tree structure data edited, as illustrated in FIG. 13. That is, as illustrated in FIG. 12, despite insertion of the character strings $T_{11}$ to $T_{19}$ on the text editor, the layout of the character strings $T_{20}$ to $T_{40}$ indicating the nodes following the inserted nodes is not broken but held so as to retain the tree structure. That is, although coping and pasting with a text editor may result in breaking a layout, execution of the above descripted processing by a compiler and a decompiler in the text editor after copying and pasting generates text data retaining a tree structure, so that the layout can be maintained unchanged in this embodiment.

[3. Processing Executed in Tree Structure Data Editing Device]

Figure 14:
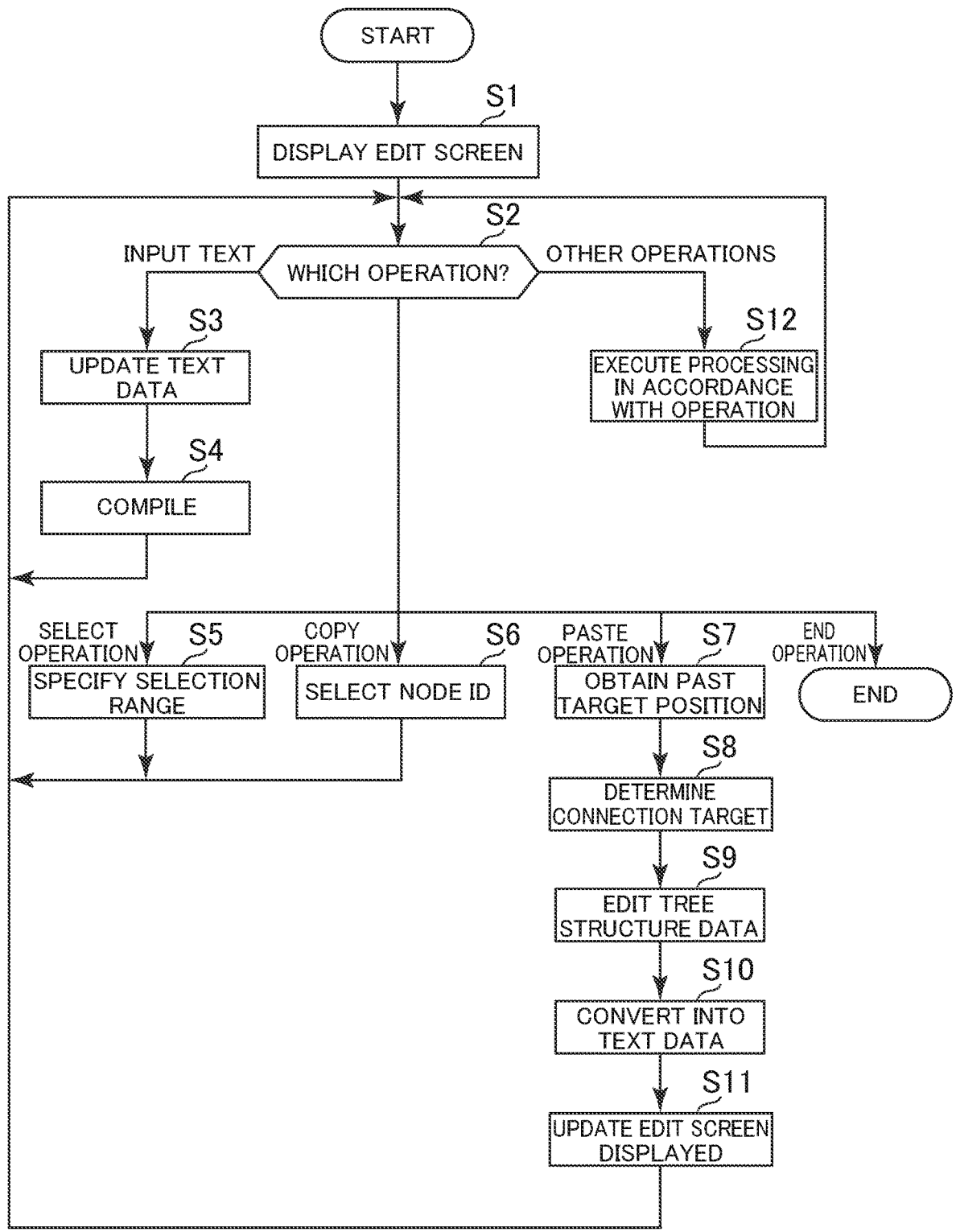
FIG. 14 is a flowchart of one example of processing executed by a tree structure data editing device.

FIG. 14 is a flowchart of one example of processing executed in the tree structure data editing device 1. The processing illustrated in FIG. 14 is executed by the control unit 2 by operating according to a program stored in the storage unit 3. In this embodiment, the processing to be described below is executed whereby the functional blocks illustrated in FIG. 2 are implemented. Below, processing to be executed when a user opens text data stored in the storage unit 3 with a text editor to edit codes will be described as an example.

As illustrated in FIG. 14, initially, the control unit 2 activates a text editor stored in the storage unit 3, and expands in the RAM the text data stored in the storage unit 3 to display the edit screen 20 on the display unit 6 (S1). The control unit 2 receives an input from the operation unit 5 (S2). Assume that the user can perform any of the operations including an input operation for inputting a text on the edit screen 20, a select operation for rectangular selection, a copy operation for copying a selection range, a paste operation for pasting an original text to be copied, an end operation for ending the text editor, and other operations applicable with the text editor.

When a user inputs a text (S2: text input), the control unit 2 updates the text data stored in the RAM of the storage unit 3 (S3). The control unit 2 compiles the text data updated at S3 to generate tree structure data (S4). In the processing at S4, the control unit 2 may decompile the generated tree structure data to update the text data. At S4, the control unit 2 generates position data, and stores in the storage unit 3.

Alternatively, when a user performs a select operation at S2 (S2: select operation), the control unit 2 specifies a selection range selected on the edit screen 20, based on the input from the operation unit 5 (S5). Specifically, at S5, the control unit 2 obtains a start position and an end position with the cursor 22 on the edit screen 20, then specifies a rectangular area having the diagonal line extending between the start position and the end position as the selection range 23, and temporarily holds information indicating the position of the selection range 23 in the storage unit 3.

Alternatively, when a user performs a copy operation at S2 (S2: copy operation), the control unit 2 selects a node ID included in the selection range obtained at S5 with reference to the position data stored in the storage unit 3 (S6). Specifically, at S6, the control unit 2 specifies a position included in the selection range 23 with reference to the text data, and specifies a node ID at a position within the selection range 23 with reference to the position data. Then, the control unit 2 temporarily stores the node ID specified at S6 in the storage unit 3. Similar to a normal text editor, the control unit 2 may hold a text in the selection range 23 in a predetermined area (a clipboard) in the storage unit 3.

Alternatively, when a user performs a paste operation at S2 (S2: paste operation), the control unit 2 obtains the position of a paste target designated in the paste operation (S7). Specifically, at S7, the control unit 2 obtains the position of a paste target in the text data, based on the position of the cursor 22 on the edit screen 20, when a past operation is performed.

Then, the control unit 2 determines a node ID at a position nearest to the position of the paste target obtained at S7 as a connection target, with reference to the position data (S8), and inputs the node ID selected at S6 and the connection target node ID determined at S8 into a compiler to edit the tree structure data (S9). Specifically, at S9, while the control unit 2 executes compiling, the node ID selected at S6 is inserted as a child node of the connection target node ID determined at S8.

The control unit 2 passes the tree structure data edited to the decompiler to convert into text data (S10), and updates the edit screen 20 displayed, based on the text data converted at S10 (S11). Specifically, at S10, while the control unit 2 executes decompiling, text data describing the tree structure data edited at S9 is generated. At S10, the control unit 2 newly generates the position data.

Alternatively, when a user performs other operations at S2 (S2: other operations), the control unit 2 executes processing in accordance with the operation (S12). The other operation may be, for example, an operation of storing text data or an operation of changing the setting of a text editor. When a user performs an end operation at S2 (S2: end operation), this processing will end.

As described above, when a copy and paste of a text in the selection range 23 is instructed in editing text data corresponding to tree structure data with a text editor, the above described tree structure data editing device 1 does not simply paste the text in the selection range 23, but passes a node ID in the selection range and the connection target node ID to a compiler to compile, and then decompiles the tree structure data. This enables reliable insertion of a subtree, and prevention of the layout of the text data from being broken. This eliminates the need for manual correction of a broken layout, which can reduce a burden on a user in editing the tree structure data with a text editor.

[4. Modified Example]

The present invention is not limited to the above described embodiment, and can be desirably modified without departing from the gist of the present invention.

Figure 15:
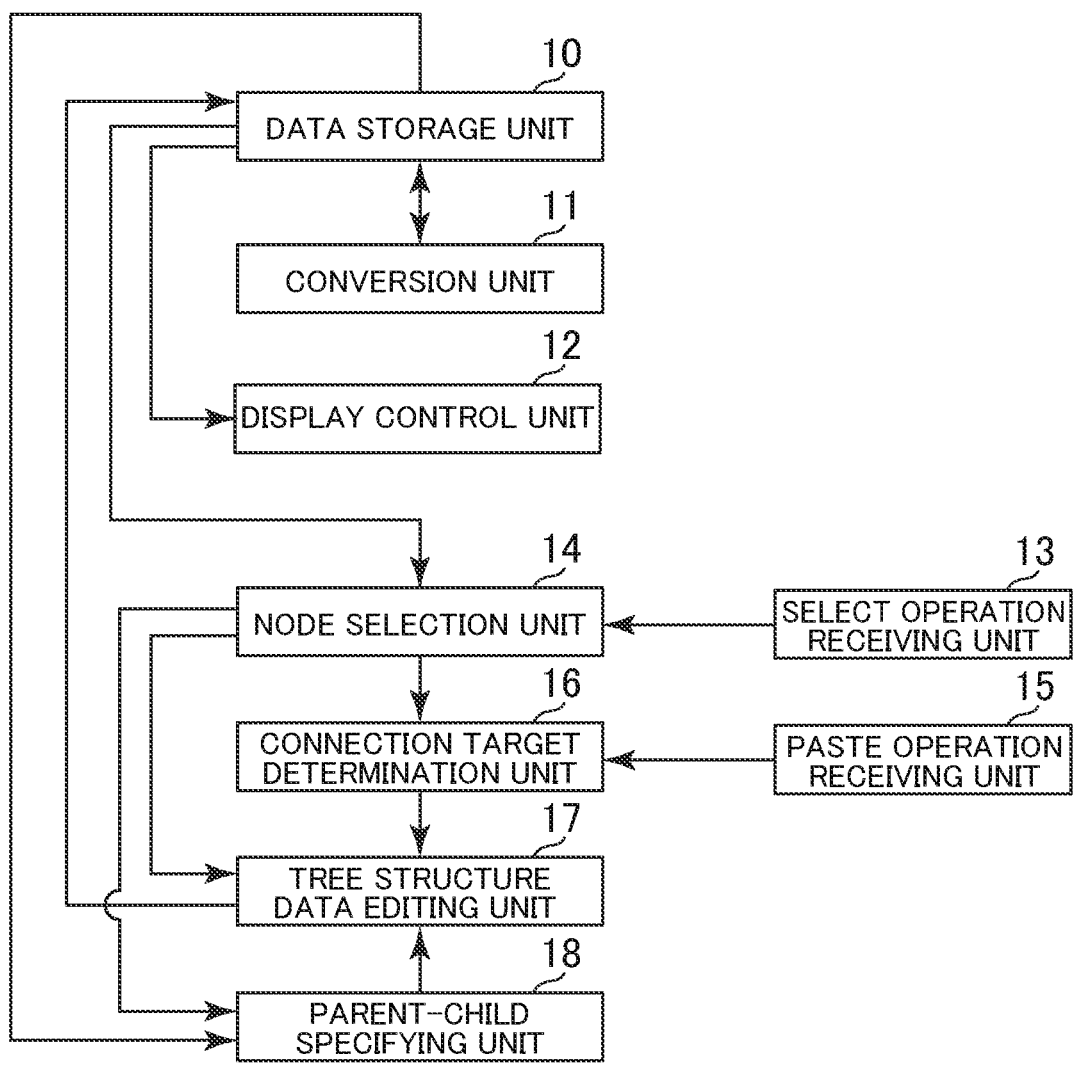
FIG. 15 is a functional block diagram in a modified example.

For example, although copying and pasting with a text editor is described as an example in the embodiment, similar processing may be executed for cutting and pasting. FIG. 15 is a functional block diagram in a modified example. As illustrated in FIG. 15, in the modified example, a parent-child specifying unit 18 is implemented in addition to the functions described in the embodiment. The parent-child specifying unit 18 is implemented mainly using the control unit 2, and specifies the parent node ID and a child node ID of one or more node IDs selected by the node selection unit 14.

Figure 16:
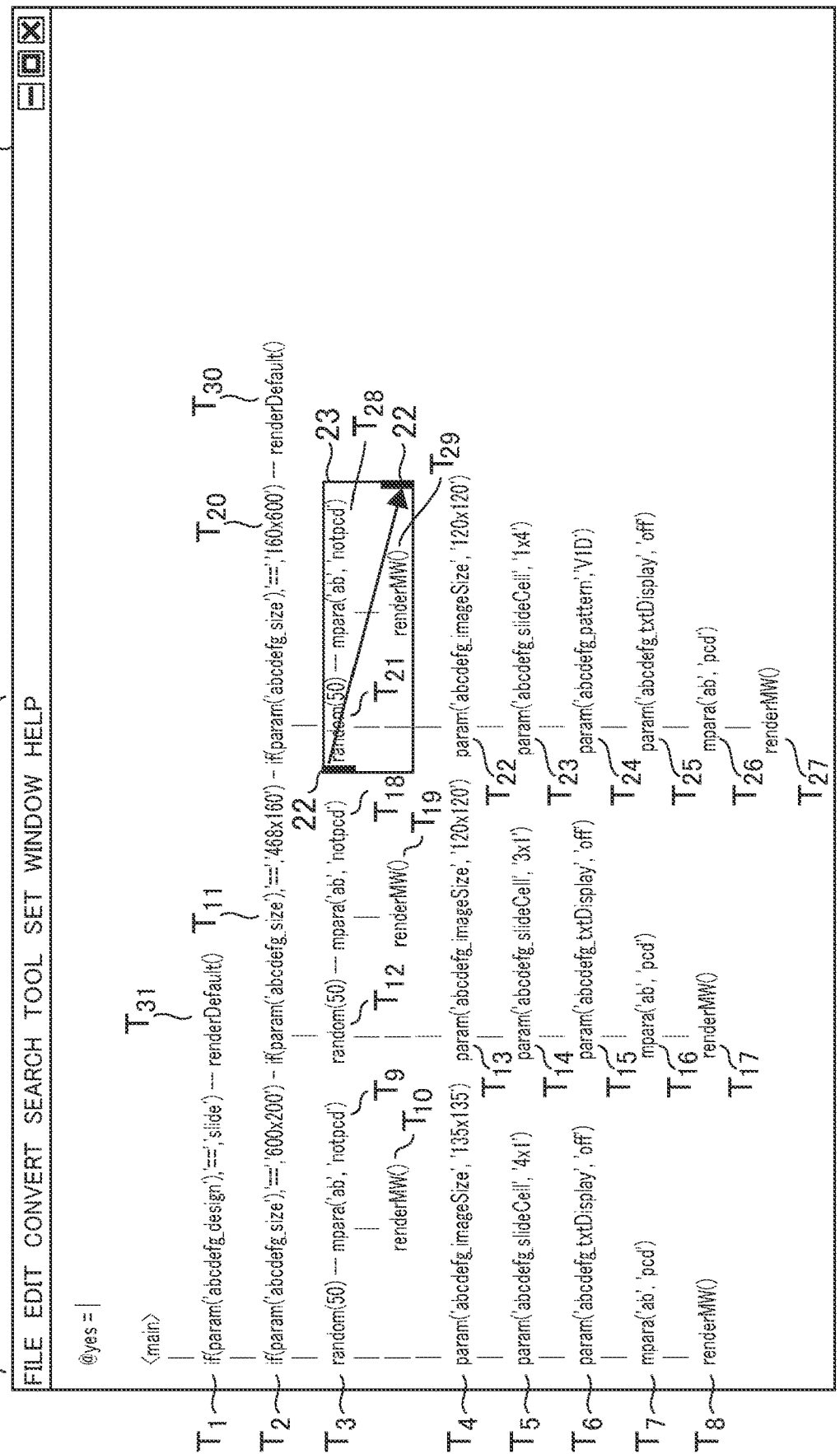
FIG. 16 illustrates a selection range designated in a modified example.
Figure 17:
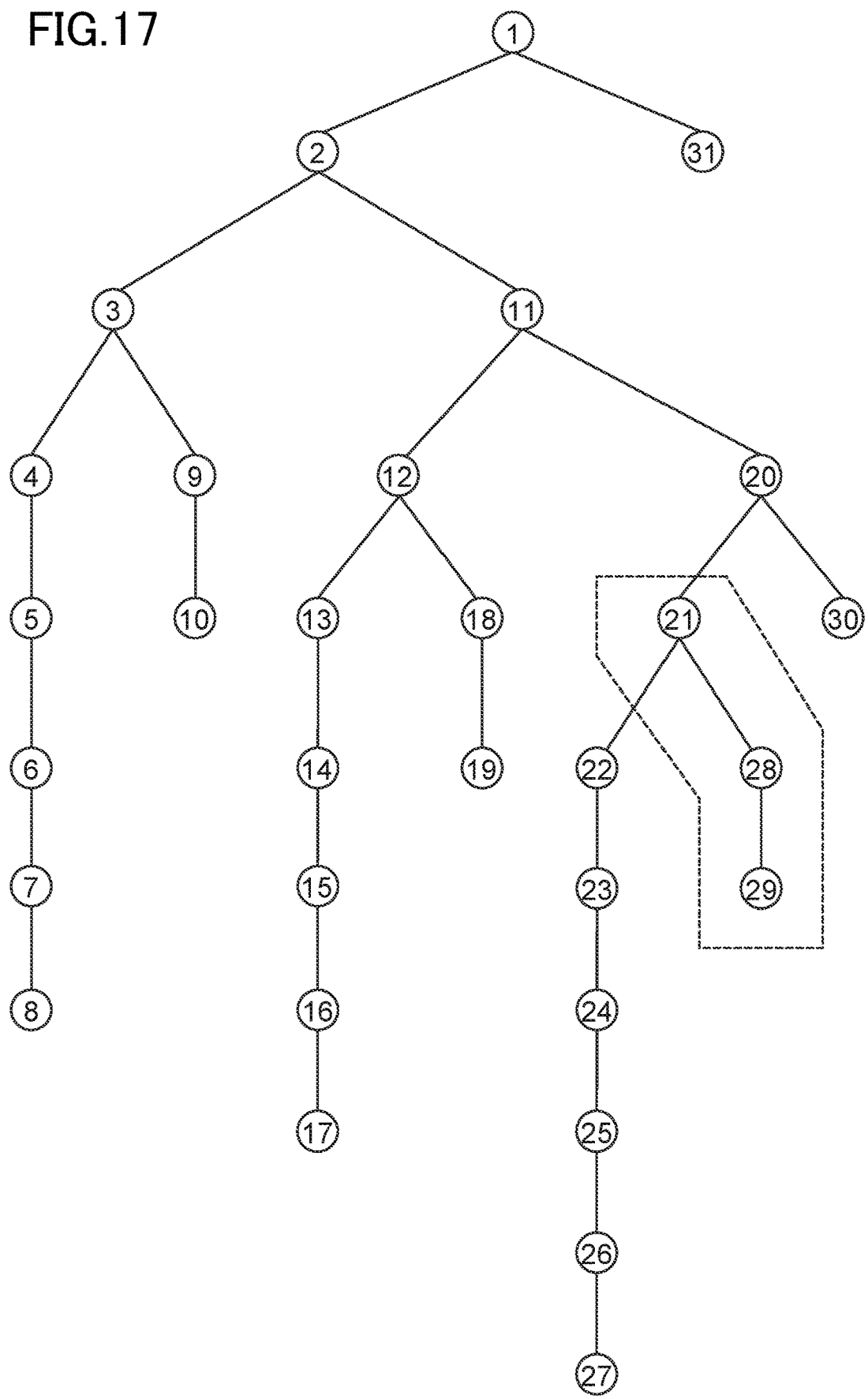
FIG. 17 illustrates a selection range designated in a modified example.

FIGS. 16 and 17 illustrate the selection range 23 designated in the modified example. The selection range 23 in the modified example can be phrased as a range for cutting out a text on the edit screen 20. When the selection range 23 is designated as illustrated in FIG. 16, as the selection range 23 contains the character strings $T_{21}$, $T_{28}$, $T_{29}$, the node selection unit 14 selects the nodes with the node IDs "21", "28", "29" (indicated by the broken line in FIG. 17), with reference to the position data, as illustrated in FIG. 17. A method for selecting a node ID in the selection range 23 is the same as that which has been described above in the embodiment.

With reference to the text data and the position data, the parent-child specifying unit 18 specifies the parent node ID and a child node ID of a subtree including these three nodes.

For example, the parent-child specifying unit 18 specifies as the parent node ID the node ID "21" of the character string $T_{20}$ that is connected via the symbol "|" positioned above the character string $T_{21}$ indicating the root node of the subtree in the selection range 23, and also as a child node ID the node ID "22" of the character string $T_{22}$ that is connected via the symbol "|" positioned below the character string $T_{21}$. As the node with the node ID "29" is a leaf node since the character string $T_{29}$ has no following symbol representing a branch, the child node ID is the node ID "22" alone.

FIG. 18 illustrates a paste target designated in the modified example. In the case illustrated in FIG. 18, the connection target determination unit 16 determines the node ID "12" as a connection target. A method for determining a connection target node ID is the same as the method described above in the embodiment. In this case, a user instructs to cut out a subtree including the node ID "21", "28", "29" selected using the selection range 23, and to insert the subtree so as to follow the node ID "12".

The tree structure data editing unit 17 updates the tree structure data such that the node or nodes identified by the one or more node IDs selected by the node selection unit 14 is/are connected to the node identified by the connection target node ID, and that the node identified by the child node ID is connected to the node identified by the parent node ID. A method for connecting to a connection target node ID is the same as a method that has been described in the embodiment. In the modified example, the tree structure data editing unit 17 compiles such that the child node ID specified by the parent-child specifying unit 18 is directly connected to the parent node ID, in addition to the processing described in the embodiment, to thereby update the tree structure data.

Figure 20:
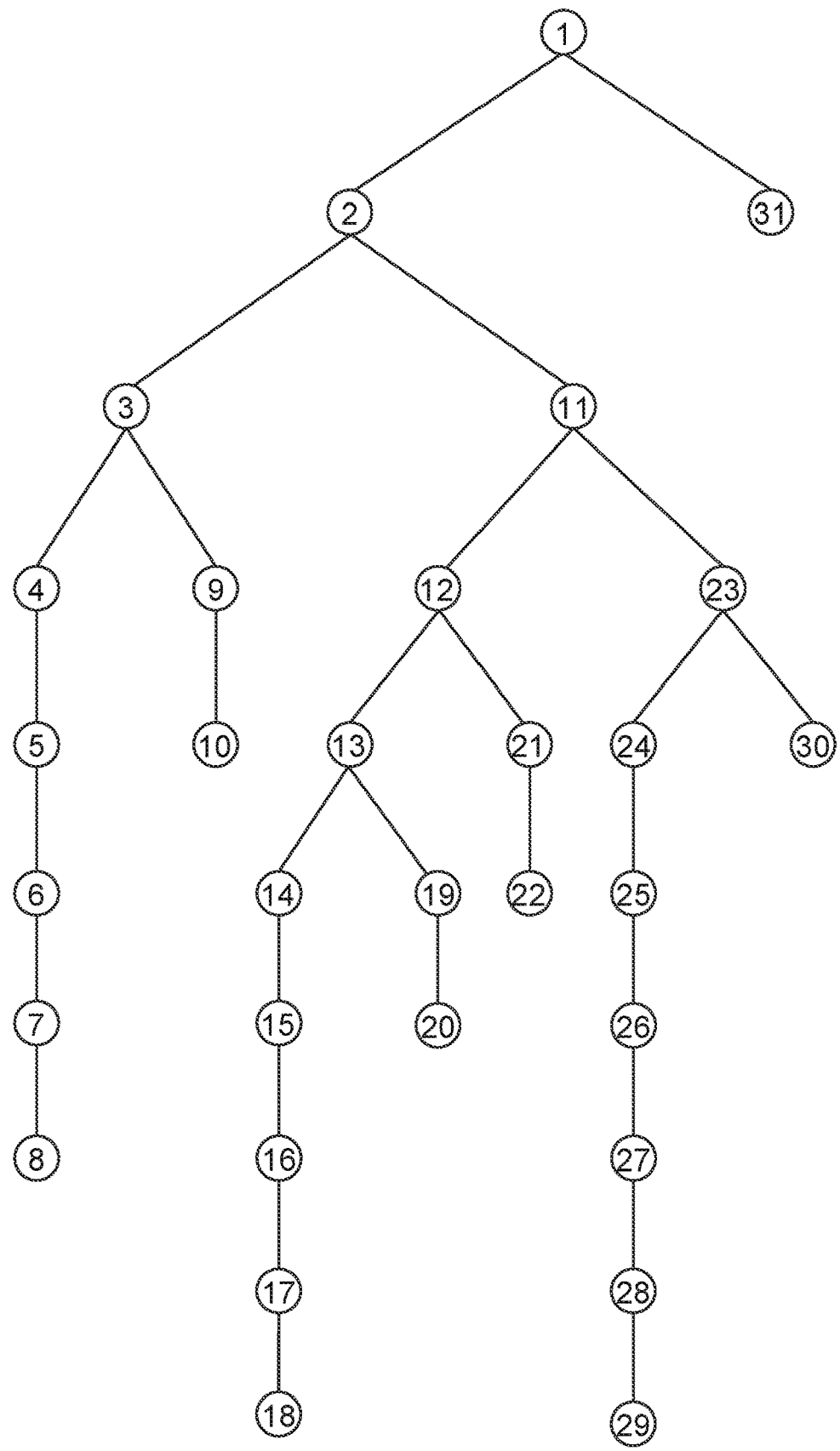
FIG. 20 illustrates tree structure data updated in a modified example.

FIGS. 19 and 20 illustrate a tree structure data updated in the modified example. As illustrated in FIGS. 19 and 20, the nodes with the node IDs "1" to "12" remain the same as those before being edited. The nodes with the node IDs "13", "19", "20" have the same content as that of the nodes with the node IDs "21", "28", "29" selected in FIG. 8. That is, the subtree in the selection range 23 is inserted as a child node of the node ID "12", or the connection target node ID. The nodes with the node IDs "14" to "18" illustrated in FIG. 20 have the same content as that of the nodes with the node IDs "13" to "17" illustrated in FIG. 8. That is, while the node with the node ID "13" illustrated in FIG. 8 has the node with the node ID "12" as the parent node, insertion of the subtree in the selection range 23 makes the node with the node ID "13" be a child node of the node ID "21" ("14" in FIG. 20), or the root node of the subtree. The node IDs "21" to "23" illustrated in FIG. 20 have the same content as that of the node IDs "18" to "20" illustrated in FIG. 8. Cutting out of the subtree including the node IDs "21", "28", "29" illustrated in FIG. 8 leads to direct connection between the node ID "20" (the node ID "23" in FIG. 20) and the node ID "22" (the node ID "24" in FIG. 20). The node IDs "24" to "31" illustrated in FIG. 20 have the same content as that of the node IDs "22" to "27", "30", "31" illustrated in FIG. 8.

Similar to the embodiment, after the above described processing by the tree structure data editing unit 17, the conversion unit 11 converts the tree structure data edited by the tree structure data editing unit 17 into text data, and the tree structure data editing unit 17 updates the position data, based on the tree structure data edited. Then, the display control unit 12 updates the edit screen 20 displayed, based on the text data converted by the conversion unit 11.

FIG. 21 illustrates the edit screen 20 after the tree structure data is edited. Specifically, text data describing the tree structure data edited is generated as illustrated in FIG. 21. That is, despite the insertion of the character strings $T_{13}$, $T_{19}$, $T_{20}$ (the character strings $T_{21}$, $T_{28}$, $T_{29}$ in FIG. 18) being cut out on the text editor, the layout of the character strings $T_{14}$ to $T_{18}$ subsequent to the inserted character strings $T_{13}$, $T_{19}$, $T_{20}$ is not broken but held so as to retain a tree structure, similar to the embodiment. Further, direct connection between the character strings $T_{23}$ and $T_{24}$ (the character strings $T_{20}$ and $T_{22}$ in FIG. 18) enables to prevent the layout in a part including the cutting-out from being broken.

In the modified example, the layout on the text data can be prevented from being broken also in the case of cutting and pasting. This eliminates the need for manual correction of a broken layout, which can reduce a burden on a user in editing the tree structure data with a text editor.

A conversion method employed by the conversion unit 11 is not limited to the above described example. The conversion unit 11 may mutually convert the tree structure data and the text data, based on a predetermined conversion rule. For example, a conversion table defining these conversion rules may be prepared in advance. Further, a method for specifying a node ID by the node selection unit 14 is not limited to the above described example. For example, the node selection unit 14 may pass a text in the selection range 23 to the compiler to thereby specify a node ID. Furthermore, a method for designating a connection target by the connection target determination unit 16 is not limited to the above described example. For example, the connection target determination unit 16 may pass a text at a position near the position designated as a connection target to the compiler to thereby specify a connection target node ID.

Although the text editor includes a compiler and a decompiler in the above, a text editor, a compiler, and a decompiler may be separate programs. The processing described above may be applied to a programming language implemented including an AB test pattern that likely generates a tree structure or to other programming languages. Further, although a source code is edited in the above described example, editing a source code is not an exclusive example, and editing tree structure data with a text editor is essential. For example, processing similar to the above described may be executed in editing a database. Still further, although a binary tree has been described as tree structure data in the above, a ternary tree or a tree branched into a larger number of subtrees is applicable as long as the tree structure is readily and visually recognizable and editable in text data.

Yet further, although the tree structure data editing device 1 is implemented using a personal computer for direct operation by a user in the above, a server computer may be used to implement the tree structure data editing device 1. In this case, a computer for direct operation by a user is connected to the tree structure data editing device 1 via a network for data exchange, so that the user accesses the tree structure data editing device 1 and causes the tree structure data editing device 1, or a server computer, to execute the above described processing. In this case, the combination of the computer to be operated by a user and the tree structure data editing device 1 may be considered as a tree structure data editing system. The above described functions may be implemented jointly by respective computers in the tree structure data editing system. In this case, the data described above as being stored in the data storage unit 10 may be stored in a separate database server.

The invention claimed is:

1. A tree structure data editing device, comprising at least one processor configured to:
   mutually convert tree structure data and text data corresponding to the tree structure data using conversion data;
   display an edit screen for the text data on a display, the edit screen being a screen of a text editor;
   select one or more node IDs in the tree structure data based on a position of the selection range, when a selection range is designated on the edit screen;
   determine a connection target node ID in the tree structure data, based on a position of the paste target, when a paste target for the selection range is designated on the edit screen;
   edit the tree structure data so a node or nodes of the selected one or more node IDs is/are connected to a connection target node identified by the connection target node ID;
   convert the edited tree structure data into the text data, and
   update the edit screen displayed, based on the converted text data;
   wherein the conversion data includes a conversion algorithm, a compiler, and a decompiler;
   wherein the conversion algorithm includes instructions for identifying a root node, a child node, a parent node, and a leaf node.

2. The tree structure data editing device according to claim 1, wherein
   the selection range is a range for cutting out text on the edit screen, and
   the at least one processor:
   specifies a parent node ID and a child node ID of the one or more node IDs, and
   updates the tree structure data so the node or nodes identified by the one or more node IDs is/are connected to the connection target node identified by the connection target node ID and a child node identified by the child node ID is connected to a parent node identified by the parent node ID.

3. The tree structure data editing device according to claim 1, wherein the at least one processor determines a node ID of a text node with text displayed at a position nearest to the position of the paste target as the connection target node ID.

4. The tree structure data editing device according to claim 1, wherein
   the edit screen is a screen of a text editor on which to input a code for a predetermined programming language, and
   the at least one processor compiles the text data to thereby convert into the tree structure data, and decompiles the tree structure data to thereby convert into the text data.

5. A method for editing tree structure data, comprising:
   mutually converting tree structure data and text data corresponding to the tree structure data using conversion data;
   displaying an edit screen for the text data on a display, the edit screen being a screen of a text editor;
   selecting one or more node IDs in the tree structure data based on a position of the selection range, when a selection range is designated on the edit screen;
   determining a connection target node ID in the tree structure data based on a position of the paste target, when a paste target for the selection range is designated on the edit screen;
   editing the tree structure data so a node or nodes of the selected one or more node IDs is/are connected to a connection target node identified by the connection target node ID;
   converting the edited tree structure data into the text data, and
   updating the edit screen based on the converted text data;
   wherein the conversion data includes a conversion algorithm, a compiler, and a decompiler;
   wherein the conversion algorithm includes instructions for identifying a root node, a child node, a parent node, and a leaf node.

6. A non-transitory computer-readable information storage medium for storing a program for causing a computer to:
   convert tree structure data and text data corresponding to the tree structure data using conversion data;
   display an edit screen for the text data on a display, the edit screen being a screen of a text editor;
   select one or more node IDs in the tree structure data based on a position of the selection range, when a selection range is designated on the edit screen;
   determine a connection target node ID in the tree structure data based on a position of the paste target, when a paste target for the selection range is designated on the edit screen; and
   edit the tree structure data so a node or nodes of the selected one or more node IDs is/are connected to a connection target node identified by the connection target node ID;
   convert the edited tree structure data edited into the text data, and
   update the edit screen displayed, based on the converted text data converted;
   wherein the conversion data includes a conversion algorithm, a compiler, and a decompiler;
   wherein the conversion algorithm includes instructions for identifying a root node, a child node, a parent node, and a leaf node.

* * * * *